US012741368B2

(12) United States Patent
Pantula et al.

(10) Patent No.: US 12,741,368 B2
(45) Date of Patent: Sep. 22, 2026

(54) MULTISEGMENTED ROBOTS AND NETWORKS OF MULTISEGMENTED ROBOTS

(71) Applicant: The Johns Hopkins University, Baltimore, MD (US)

(72) Inventors: Aishwarya Pantula, Baltimore, MD (US); Siming Deng, Baltimore, MD (US); Noah J. Cowan, Baltimore, MD (US); Thao D. Nguyen, Baltimore, MD (US); Jiayu Liu, Baltimore, MD (US); Bibekananda Datta, Baltimore, MD (US); David H. Gracias, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 113 days.

(21) Appl. No.: 18/662,555

(22) Filed: May 13, 2024

(65) Prior Publication Data

US 2024/0375270 A1 Nov. 14, 2024

Related U.S. Application Data

(60) Provisional application No. 63/465,985, filed on May 12, 2023.

(51) Int. Cl.
*B25J 9/06* (2006.01)

(52) U.S. Cl.
CPC .................................... *B25J 9/06* (2013.01)

(58) Field of Classification Search
CPC ....................................................... B25J 9/06

(Continued)

(56) References Cited

U.S. PATENT DOCUMENTS

2020/0035390 A1* 1/2020 Hu ........................ F03G 7/0612

OTHER PUBLICATIONS

Ricotti et al., "Biohybrid actuators for robotics: A review of devices actuated by living cells", Sci Robot., (Nov. 29, 2017), vol. 2, (17 pages).

(Continued)

*Primary Examiner* — B M M Hannan
(74) *Attorney, Agent, or Firm* — Venable LLP; Ryan Ward

(57) ABSTRACT

A multisegmented robot includes a first robot segment comprising a first layer of active material at least one of integral with, attached to or formed on a first layer of passive material; a second robot segment spaced apart from the first robot segment, the second robot segment including a second layer of active material at least one of integral with, attached to or formed on a second layer of passive material; and a tether connecting the first and second robot segments. The first and second layers of active material are each cyclically swellable and deswellable in response to a corresponding cyclically changing local environmental stimulus thereby causing each of the first and second segments to cyclically change shape, the first layer of passive material has a surface arranged such that at least a portion thereof contacts a surface over which the robot may crawl during the cyclically changing the local environmental stimulus, the second layer of passive material has a surface arranged such that at least a portion thereof contacts the surface over which the robot may crawl during the cyclically changing the local environmental stimulus, and the second robot segment has a greater frictional resistance to movement over a period of the cyclically changing local environmental stimulus than a frictional resistance to movement of the first robot segment over the period of the cyclically changing local environmental stimulus resulting in translational motion of the robot (Continued)

along a direction from the first robot segment to the second robot segment.

20 Claims, 17 Drawing Sheets

(58) Field of Classification Search
USPC .......................................................... 700/245
See application file for complete search history.

(56) References Cited

OTHER PUBLICATIONS

Cianchetti et al., "Biomedical applications of soft robotics", Nat. Rev. Mater., (Jun. 2018), vol. 3, pp. 143-153.
Erol et al., "Transformer Hydrogels: A Review", Adv. Mater. Technol., (2019), vol. 4, 1900043, (27 pages).
Hines et al., "Soft Actuators for Small-Scale Robotics", Adv. Mater., (2017), vol. 29, (43 pages).
Stuart et al., "Emerging applications of stimuli-responsive polymer materials", Nat. Mater., (2010)c, vol. 9, pp. 101-113.
Liu et al., "Hydrogel machines", Mater. Today, (Jun. 2020), vol. 36, pp. 102-124.
Tan et al., "Smart Polymers for Microscale Machines", Adv. Funct. Mater., (2021), vol. 31, 2007125, (56 pages).
Huang et al., "Increasingly Intelligent Micromachines", Annu. Rev. Control Robot. Auton. Syst., (2022), vol. 5, pp. 279-310.
Yuk et al., "Hydraulic hydrogel actuators and robots optically and sonically camouflaged in water", Nat. Commun., (Feb. 1, 2017), vol. 8, 14230, (12 pages).
Liu et al., "Dual-Gel 4D Printing of Bioinspired Tubes", ACS Appl. Mater. Interfaces., (2019), vol. 11, pp. 8492-8498.
Li et al., "Soft actuators for real-world applications", Nat. Rev. Mate., (Mar. 2022), vol. 7, pp. 235-249.
Jain et al., "Tunable LCST behavior of poly(N-isopropylacrylamide/ionic liquid) copolymers", Polym. Chem., (2015), vol. 6, pp. 6819-6825.
Kobayashi et al., "Multitemperature Responsive Self-Folding Soft Biomimetic Structures", Macromol. Rapid Commun., (2018), vol. 39, (7 pages).
Maeda et al., "Self-Walking gel", Advanced Materials., (2007), vol. 19, pp. 3480-3484.
Arora et al., "Earthworm Inspired Locomotive Motion from Fast Swelling Hybrid Hydrogels", J. Polym. Sci., Part A: Polym. Chem., (Oct. 2009), vol. 47, pp. 5027-5033.
Kim et al., "Programming magnetic anisotropy in polymeric microactuators", Nat. Mater., (Oct. 2011), vol. 10, pp. 747-752.
Vernerey et al., "The mechanics of hydrogel crawlers in confined environment", J. R. Soc. Interface., (2017), vol. 14, (11 pages).
Shen et al., "Remotely Triggered Locomotion of Hydrogel Mag-Bots in Confined Spaces", Sci. Rep., (2017), vol. 7, 16178, (10 pages).
Gao et al., "Snap-Buckling Motivated Controllable Jumping of Thermo-Responsive Hydrogel Bilayers", ACS Appl. Mater. Interfaces., (2018), vol. 10, pp. 41724-41731.
Feinberg et al., "Muscular Thin Films for Building Actuators and Powering Devices", Science, (Sep. 7, 2007), vol. 317, No. 5843, pp. 1366-1370.
Chan et al., "Development of Miniaturized Walking Biological Machines", Sci. Rep., (2012), vol. 2, 857, (8 pages).
Gladman et al., "Biomimetic 4D printing", Nat. Mater., (Apr. 2016), vol. 15, pp. 413-418.
Mao et al., "3D Printed Reversible Shape Changing Components with Stimuli Responsive Materials", Sci. Rep., (2016), vol. 6, 24761, (13 pages).
Ge et al., "Multimaterial 4D Printing with Tailorable Shape Memory Polymers", Sci. Rep., (2016), vol. 6, 31110, (11 pages).
Bakarich et al., "3D/4D Printing Hydrogel Composites: A Pathway to Functional Devices", MRS Advances, (2016), vol. 1, (8 pages).
Guo et al., "4D Printing of Robust Hydrogels Consisted of Agarose Nanofibers and Polyacrylamide", ACS Macro Lett., (2018), vol. 7, pp. 442-446.
Jin et al., "Nanoclay-Based Self-Supporting Responsive Nanocomposite Hydrogels for Printing Applications", ACS Appl. Mater. Interfaces., (2018), vol. 10, pp. 10461-10470.
Schaffner et al., "3D printing of robotic soft actuators with programmable bioinspired architectures", Nat. Commun., (2018), vol. 9, (9 pages).
Liu et al., "Periodic buckling of soft 3D printed bioinspired tubes", Extreme Mech. Lett., (2019), vol. 30, 100514, (8 pages).
Hirose et al., "Snake-Like Robots", [Tutorial]. IEEE Robot. Autom. Mag., (Mar. 2009), 16, 88-98.
Maladen et al., "Undulatory Swimming in Sand: Subsurface Locomotion of the Sandfish Lizard", Science , (Jul. 17, 2009), vol. 325, pp. 314-318.
Tanaka et al., "Mechanics of peristaltic locomotion and role of anchoring", J. R. Soc. Interface, (2012), vol. 9, pp. 222-233.
Kuroda et al., "Common mechanics of mode switching in locomotion of limbless and legged animals", J. R. Soc. Interface., (2014), vol. 11, 20140205, (11 pages).
Aguilar et al., "A review on locomotion robophysics: the study of movement at the intersection of robotics, soft matter and dynamical systems", Rep. Prog. Phys., (2016), vol. 79, 110001, (36 pages).
Ijspeert et al., "From Swimming to Walking with a Salamander Robot Driven by a Spinal Cord Model", Science, (Mar. 9, 2007), vol. 315, pp. 1416-1420.
Easteal et al., "Diaphragm cell for high-temperature diffusion measurements: Tracer Diffusion Coefficients for Water to 363 K", J. Chem. Soc., Faraday Trans., (1989), vol. 85, No. 5, pp. 1091-1097.
Tanaka et al., "Critical Kinetics of Volume Phase Transition of Gels", Phys. Rev. Lett., (Nov. 25, 1985), vol. 55, No. 22, pp. 2455-2458.
Lu et al., "Origin of hysteresis observed in association and dissociation of polymer chains in water", Phys. Chem. Chem. Phys., (Apr. 2010), vol. 12, pp. 3188-3194.
Chester et al., "A thermo-mechanically coupled theory for fluid permeation in elastomeric materials: Application to thermally responsive gels", J. Mech. Phys. Solids., (2011), vol. 59, 1978-2006.
Simi et al., "Importance of Hydration and Surface Structure for Friction of Acrylamide Hydrogels", Tribol. Lett., (2020), vol. 68, 64, (12 pages).
Liu et al., "The living interface between synthetic biology and biomaterial design", Nat. Mater., (Apr. 2022), vol. 21, pp. 390-397.
Chester et al., "A finite element implementation of a coupled diffusion-deformation theory for elastomeric gels", Int. J. Solids Struct., (2015), vol. 52, pp. 1-18.
Flory, "Thermodynamics of high polymer solutions", J. Chem. Phys., (Jan. 1942), vol. 10, pp. 51-61.
Bonn et al., "Laponite: Aging and shear rejuvenation of a colloidal glass", Phys. Rev. Lett., (Jul. 1, 2002), vol. 89, No. 1, pp. 015701-015701-4.
Wang et al., "Thermosensitive phase behavior and drug release of in situ gelable poly(N-isopropylacrylamide-co-acrylamide) microgels", Colloid and Polymer Science, (2007), vol. 285, pp. 515-521.
Hong et al., "A theory of coupled diffusion and large deformation in polymeric gels", J. Mech. Phys. Solids, (2008), vol. 56, pp. 1779-1793.
Chester et al., "A coupled theory of fluid permeation and large deformations for elastomeric materials", J. Mech. Phys. Solids., (2010), vol. 58, pp. 1879-1906.
Yoon et al., "Functional stimuli responsive hydrogel devices by self-folding", Smart Mater. Struct., (2014), vol. 23, (11 pages).
Choi et al., "Poly (N-isopropylacrylamide) Hydrogel for Diving/Surfacing Device", Micromachines, (2021), vol. 12, (10 pages).

* cited by examiner

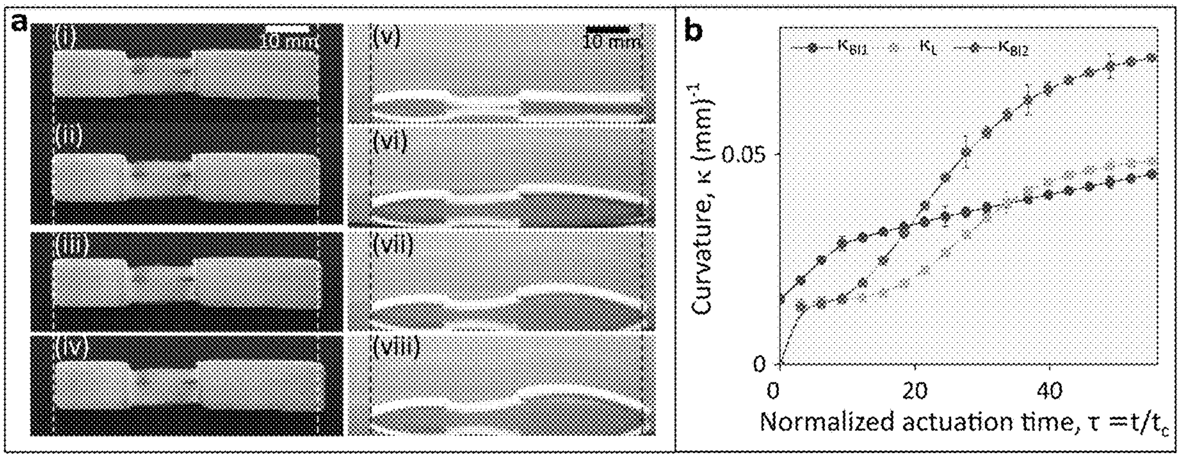
FIG. 8A
FIG. 8B
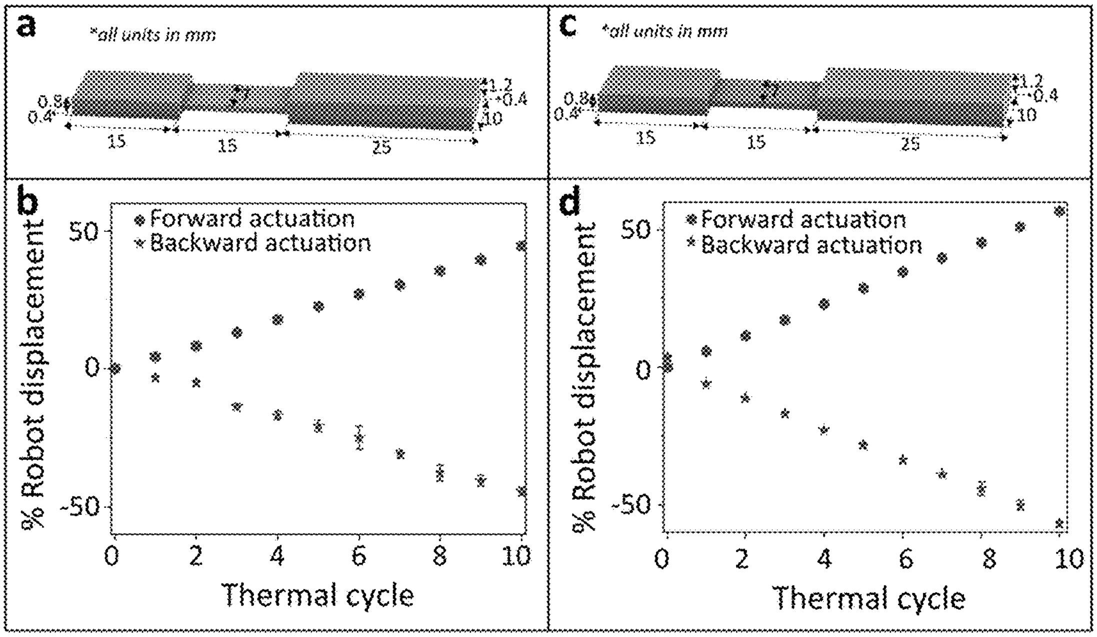
FIGS. 9A-9D

MULTISEGMENTED ROBOTS AND NETWORKS OF MULTISEGMENTED ROBOTS

CROSS-REFERENCE OF RELATED APPLICATION

This application claims priority to U.S. Provisional Application No. 63/465,985 filed May 12, 2023; the entire content of which is hereby incorporated by reference.

STATEMENT OF GOVERNMENT SUPPORT

This invention was made with government support under grant EFMA 1830893 awarded by the National Science Foundation. The government has certain rights in the invention.

BACKGROUND

1. Technical Field

The currently claimed embodiments of the present invention relate to robots, and more particularly to multisegmented robots connected by linkers where asymmetry in contact area enables directional motion and networks of such multisegmented robots.

2. Discussion of Related Art

Stimuli-responsive, untethered gels that can traverse aqueous environments can have biomedical, microfluidic, and soft robotic applications. (1-3) Compared to tethered robots that utilize fluidic or pneumatic signals to control their movement, untethered hydrogel robots can be mass-produced, are maneuverable in tight spaces, and can operate in the absence of wiring or external power sources. (4) Particularly, stimuli-responsive hydrogels, which can undergo volumetric phase transitions (such as swelling and deswelling) in response to environmental stimuli such as heat, light, pH, chemicals, biochemicals, and electromagnetic fields, are attractive materials for building untethered robots. (3-8) Previously, researchers have structured these materials to create a range of shape-changing and functional transformer hydrogels such as grippers, fluidic actuators, and valves. (3, 9-11)

A relevant class of stimuli-responsive hydrogels is based on reversibly-thermoresponsive poly (N-isopropylacrylamide) (pNIPAM). These hydrogels undergo lower critical solution temperature (LCST) transitions in the human physiological and ambient temperature range. Moreover, the LCST can be tuned by varying the side-chain length, cross-linking with compatible copolymers, or mixing with ionic liquids. (12, 13) Prior studies have utilized molding, 3D printing, and stereolithography to create micro and meso-structured pNIPAM structures capable of locomotion. For example, Maeda et al. used the Belousov-Zhabotinsky oscillatory reaction to locomote a catalyst modified pNIPAM strip at a constant temperature. (14) Elsewhere, researchers have used inherently simple single-segment pNIPAM bilayers to create a variety of crawling robots. (15-19) However, it has been challenging to break morphological symmetry (a fundamental requirement of directed locomotion) using just swelling and deswelling of a gel bilayer. Consequently, attempts at creating bilayer hydrogel crawlers have necessitated ratcheted substrates or constrained channels to break symmetry and direct motion, limiting the applicability of these robots. (19) While it has been possible to break symmetry using cardiac cell-based robots, this scheme requires the patterned deposition of proteins and live cells on some parts of the robot, not others. (20, 21) Therefore, there remains a need for improved multisegmented robots.

SUMMARY

A multisegmented robot according to an embodiment of the current invention includes a first robot segment comprising a first layer of active material at least one of integral with, attached to or formed on a first layer of passive material; a second robot segment spaced apart from the first robot segment, the second robot segment including a second layer of active material at least one of integral with, attached to or formed on a second layer of passive material; and a tether connecting the first and second robot segments. The first and second layers of active material are each cyclically swellable and deswellable in response to a corresponding cyclically changing local environmental stimulus thereby causing each of the first and second segments to cyclically change shape, the first layer of passive material has a surface arranged such that at least a portion thereof contacts a surface over which the robot may crawl during the cyclically changing the local environmental stimulus, the second layer of passive material has a surface arranged such that at least a portion thereof contacts the surface over which the robot may crawl during the cyclically changing the local environmental stimulus, and the second robot segment has a greater frictional resistance to movement over a period of the cyclically changing local environmental stimulus than a frictional resistance to movement of the first robot segment over the period of the cyclically changing local environmental stimulus resulting in translational motion of the robot along a direction from the first robot segment to the second robot segment.

A network of multisegmented robots according to an embodiment of the current invention can include at least one multisegmented robot according to an embodiment of the current invention.

BRIEF DESCRIPTION OF THE DRAWINGS

FIG. 1A. (a), illustrate an embodiment of a 3D printing process; FIG. 1B. (b), illustrates an embodiment of sacrificial layer dissolution; FIG. 1C. (c), illustrates an embodiment of thermal actuation (One thermal cycle comprised a cooling half-cycle at 25° C. and a heating half-cycle at 60° C.); FIG. 1D. (d), illustrates some embodiments of varying linker stiffness; FIG. 1E. (e), illustrates some embodiments of varying the contact force distribution using linker stiffness to increase robot actuation distance during thermal cycling. The percentage robot displacement is the distance crawled normalized by its body length in one thermal cycle. The area shaded in blue describes the cooling half-cycle, and the area in red describes the heating half-cycle.

Figures 1A, 1B, 1C, 1D, 1E:
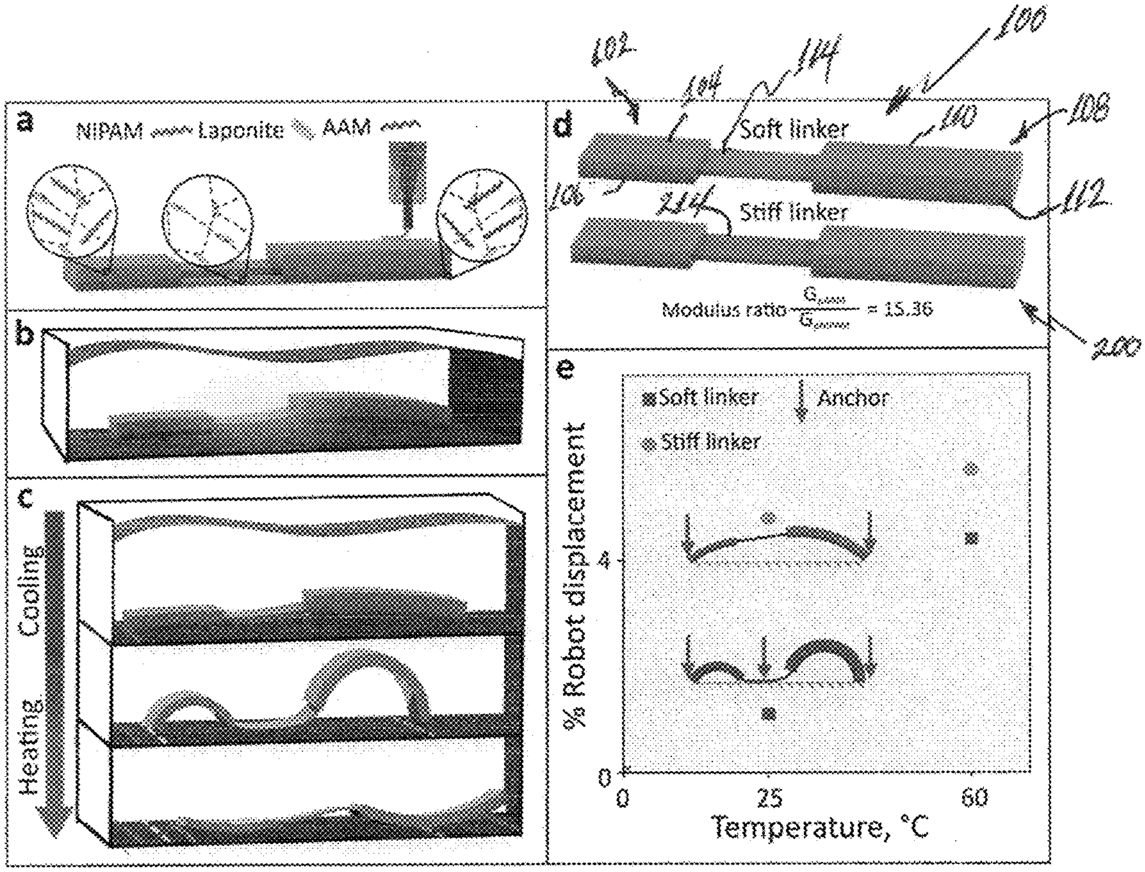
FIGS. 1A-1E provide schematic illustrations of design and fabrication of multisegmented gel robots with a suspended linker according to and embodiment of the current invention.

The images were taken during one thermal cycle by first cooling to 25° C. (i-iii) and then heating to 60° C. (iv-v) over ten hours. $D_o$ is the self-diffusivity of water at 60° C. (37) The bilayer deswelled beyond its cured state and achieved negative curvature at the end of heating (v) t=180. The scale bar in (i) indicates a length of 10 mm. The color scaling gradient indicates the polymer volume fraction from the finite element simulations with lower numbers indicating larger swelling. The polymer volume fractions at cured state, fully swollen at 25° C., and fully deswollen state were 0.67, 0.59, and 0.72, respectively. (b) Plot of the curvature of the 0.8 mm pNIPAM-0.4 mm pAAM bilayer (Bl1) and 0.8 mm pNIPAM-0.8 mm pAAM bilayer (Bl2) observed over normalized actuation time during the cooling (blue area) and heating (red area) half-cycles. Both bilayers fully swelled by t=80 and deswelled by T=165. The data points are from experiments with the shading representing the standard deviation with a sample size of three. The dashed lines represent the fitted model from simulations. (c) Plot of the normalized actuation time vs bilayer thickness ratio, B=$h_{pNIPAM}$/$h_{pAAM}$, and normalized diffusivity, D/$D_o$.

FIGS. 3A-3F: Thermal cycling of two-segment robots with a flexible or a stiff linker. Robot with (a-c) a flexible pNIPAM linker. (a) Experimental images of the robot across one thermal cycle consisting of one cooling/heating half-cycle. (i-iii) Cooling half-cycle: (i) Cured state, (ii) intermediate state, and (iii) swollen state. (iv-v). Heating half-cycle: (iv) Intermediate state, and (v) deswollen state of robot. (b) Experimental images of the robot observed at the end of each of five thermal cycles. (c) Plot of the percentage robot displacement at the end of each thermal cycle. This robot with a flexible linker crawled 12 mm after five cycles which is equivalent to 4.4% body length/cycle. (d-f) Robot with a stiff pAAM linker. (d) Experimental images of the robot across one thermal cycle consisting of one cooling/heating half-cycle. Cooling half-cycle: (i) Cured state, (ii) intermediate state, and (iii) swollen state. Heating half-cycle: (iv) Intermediate state, and (v) deswollen state of robot. (e) Experimental images of the robot observed at the end of each of three thermal cycles. (e) Plot of the percentage robot displacement at the end of each thermal cycle. This robot with the stiff linker crawled 9.3 mm in three cycles which is equivalent to 5.6% body length/cycle. Error bars in (c) and (f) indicate a standard deviation with a sample size of three.

FIGS. 4A-4F: Finite element analysis of a two-segment robot with different linkers. (a-c) Robot with a flexible linker. (a) Temporal snapshots of the robot crawling upon cooling (t=180 minutes) and heating (t=360 minutes). (b) A plot of the lateral displacement of the center of the bilayers and the linker versus normalized time for cooling (blue area) and heating (red area) half-cycles. (c) A plot of the normal force (the force perpendicular to the contact surface) exerted by different segments on the contact surface versus normalized time. (d-f) Robot with a short and stiff linker. (d) Temporal snapshots of smaller bilayer moving towards the larger bilayer upon cooling. (e) A plot of lateral displacement of the outer edges of the bilayers versus normalized time. (f) A plot of the normal force on the contact surface exerted by the bilayers versus normalized time.

FIGS. 5A-5D: Displacement of gel robots with varying bilayer segments and linker morphology. (a) Experimental images of a three-segment robot at the end of each heating and cooling half-cycle over three consecutive cycles. (b) Experimental images of a four-segment robot at the end of each heating and cooling half-cycle over three consecutive cycles. (c) Plot of the percentage robot displacement of the three-segment and four-segment robots over three thermal cycles. The error bars indicate the standard deviation with a sample size of three. The three-segment robot moved 7.63% body length/cycle, whereas the four-segment robot moved 12.2% body length/cycle. (d) Comparison of the average percentage displacement of all the experimentally demonstrated robots.

Figures 6A, 6B:
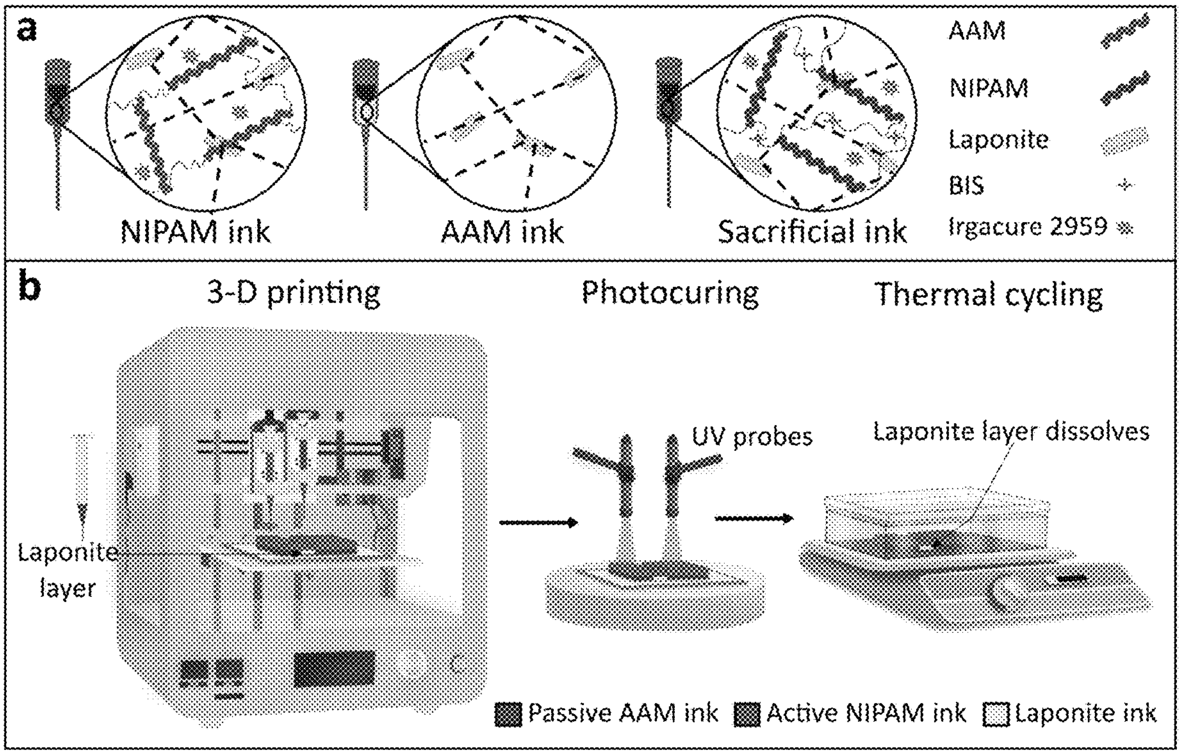

FIGS. 6A-6B: 3D printing process and ink composition. (a) Schematic of the molecular structure of the crosslinked active pNIPAM, passive pAAM, and sacrificial Laponite inks. (b) Schematic of the overall robot fabrication and thermal stimulation (actuation) process.

Figures 7A, 7B:
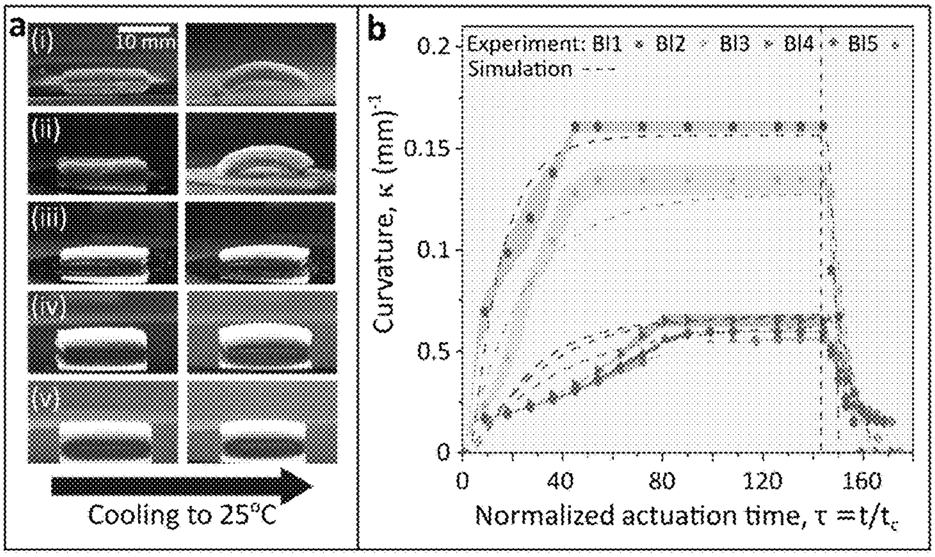

FIGS. 7A-7B: Bilayer timelapse study. (a) Equilibrated images of gel bilayers over a cooling half-cycle with different thickness ratios; (i) 0.4 mm pNIPAM-0.4 mm pAAM, (ii) 0.8 mm pNIPAM-0.4 mm pAAM, (iii) 0.8 mm pNIPAM-0.8 mm pAAM, (iv) 1.2 mm pNIPAM-0.8 mm pAAM, (v) 1.6 mm pNIPAM-0.8 mm pAAM. (b) Plot of the curvature, $\kappa$, versus normalized actuation time for bilayers with different thickness ratios, (Bl1) 0.4 mm pNIPAM-0.4 mm pAAM, (Bl2) 0.8 mm pNIPAM-0.4 mm pAAM, (Bl3) 0.8 mm pNIPAM-0.8 mm pAAM, (Bl4) 1.2 mm pNIPAM-0.8 mm pAAM bilayers, (Bl5) 1.6 mm pNIPAM-0.8 mm pAAM. The normalized actuation time, $\tau$, is defined as $\tau$=t/$t_c$, of the bilayer $$\left(\text{where } t_c = l_c^2 \big/ D_o,\ l_c = 1\ \text{mm},\ D_o = 5\times10^{-9}\text{m}^2\big/\text{s}\right).$$

The blue shaded area represents the cooling half-cycle, and the red represents the heating half-cycle. Shading along each experimental plot represents a standard deviation with a sample size of three.

FIGS. 8A-8B: Swelling study of the two-segment robot with a flexible linker. (a) Displacement of the two-segment robot with flexible linker during the cooling half-cycle observed in top view (i, ii, iii, iv), and side view (v, vi, vii, viii) at normalized actuation time $\tau$=0 (i, v), 20 (ii, vi), 36 (iii, vii), and 55 (iv, viii). (b) Plot of the curvature, $\kappa$, with respect to normalized actuation time, $\tau$, for the small bilayer ($\kappa_{Bl1}$), larger bilayer ($\kappa_{Bl2}$), and flexible linker ($\kappa_L$). Bars indicate a standard deviation for a sample size of three.

FIGS. 9A-9D: Two-segment robot with varying linker stiffness. (a-b) Two-segment robot with a flexible linker: (a) Dimensions and (b) 20-cycle statistical study of the robot. A plot of percentage robot displacement of robot against the thermal actuation cycle. The robot moved 4.4% body length/cycle. (c-d) Two-segment robot with a stiff linker: (c) Dimensions and (d) 20-cycle statistical study of the robot. A plot of percentage robot displacement against the thermal actuation cycle. The robot moved 5.1% body length/cycle. Bars in (b) and (d) indicate standard deviation with a sample size of three.

FIGS. 10A-10D: Varying linker morphology and bilayer segments. (a-b) Three-segment robot with an alternating linker: (a) Dimensions and (b) 20-cycle statistical study of the robot. A plot of percentage robot displacement against the thermal actuation cycle. The robot moved 7.63% body length/cycle. (c-d) Four-segment robot with an alternating linker: (c) Dimensions and (d) 20-cycle statistical study of the robot. A plot of percentage robot displacement against the thermal actuation cycle. The robot moved 12.2% body length/cycle. Bars in (b) and (d) indicate standard deviation with a sample size of three.

Figures 11A, 11B, 11C:
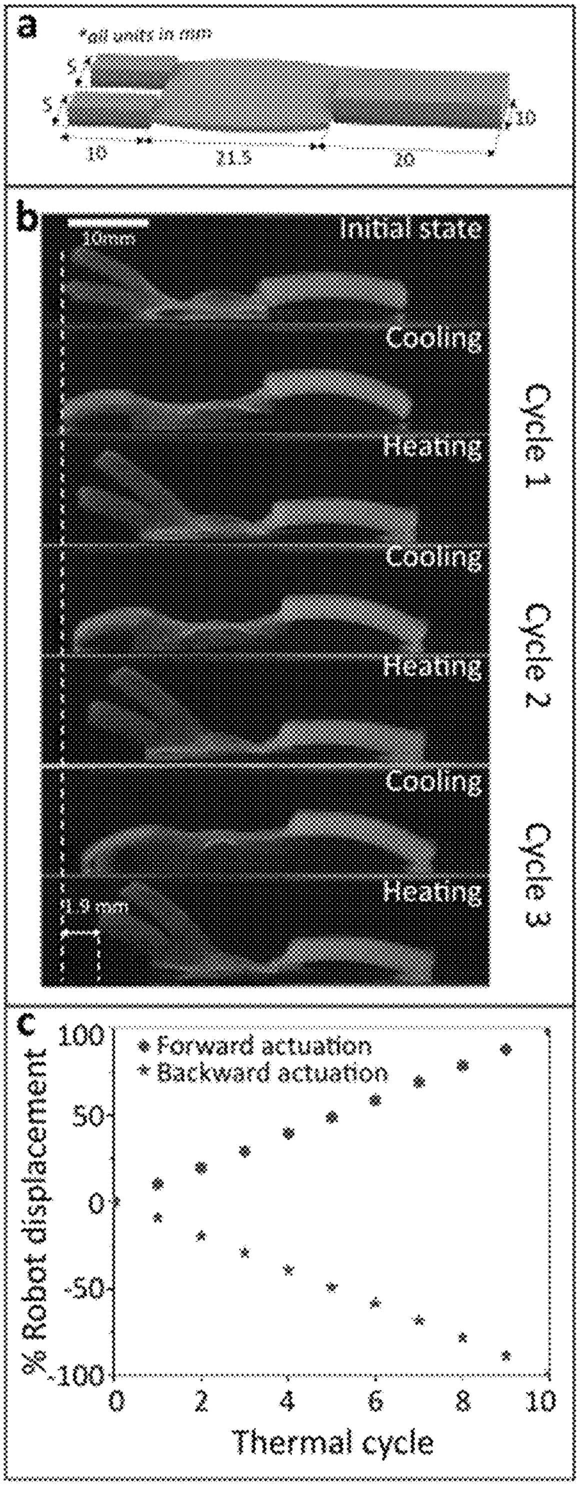

FIGS. 11A-11C: Three-segment robot with a flexible linker. (a) Dimensions and (b) Percentage robot displacement of the robot from experiments over three thermal cycles. The robot moved 3.9% body length/cycle. (c) 20-cycle statistical study of the robot. A plot of percentage robot displacement against the thermal actuation cycle. The robot moved 3.9% body length/cycle. Bars indicate a standard deviation with a sample size of three.

Figure 12:
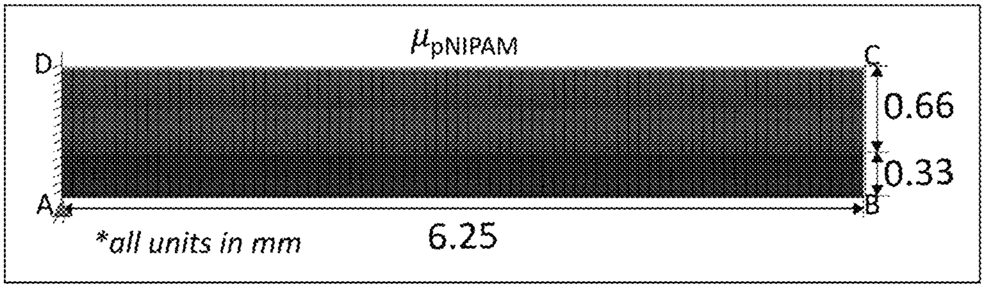

FIG. 12: Details of the finite element model of the pNIPAM-pAAM bilayer. Meshing and applied boundary conditions to pNIPAM-pAAM bilayer (Bl2) with a dry state dimension of l=6.25 mm, $h_{pNIPAM}$=0.66 mm, $h_{pAAM}$=0.33 mm. The cured state dimensions of the bilayer were l=7.5 mm, $h_{pNIPAM}$=0.8 mm, $h_{pAAM}$=0.4 mm. The finite element model is half-symmetric about the y-axis (edge AD), and the green outline along edges BC and CD indicates the application of chemical potential boundary conditions.

Figure 13:
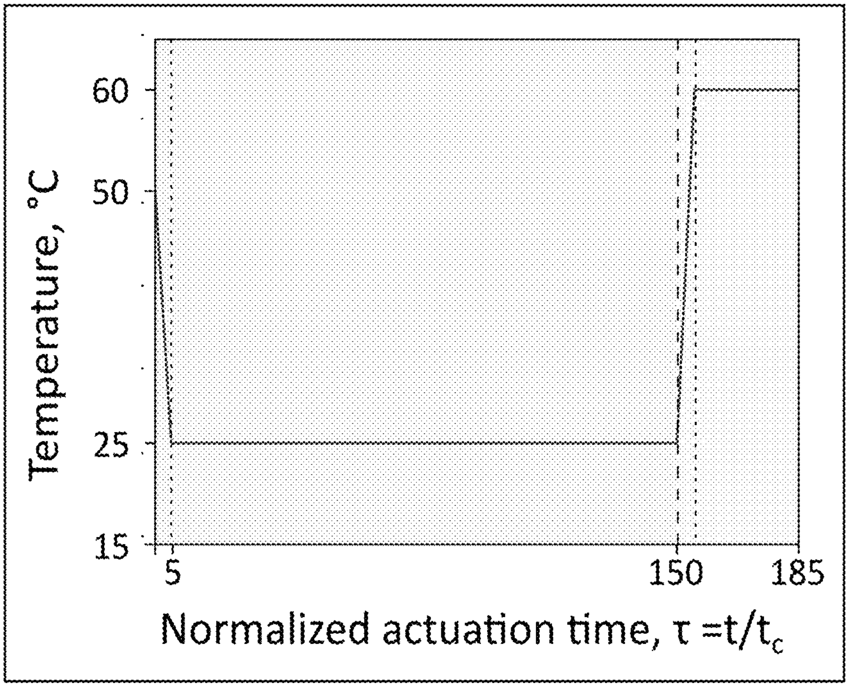

FIG. 13: Temperature profile applied to the pNIPAM-pAAM bilayers. A plot of the temperature history was applied to the pNIPAM-pAAM bilayers to calibrate swelling and deswelling equilibrium and kinetics properties. The blue shaded area represents the cooling half-cycle, and the red represents the heating half-cycle.

Figure 14:
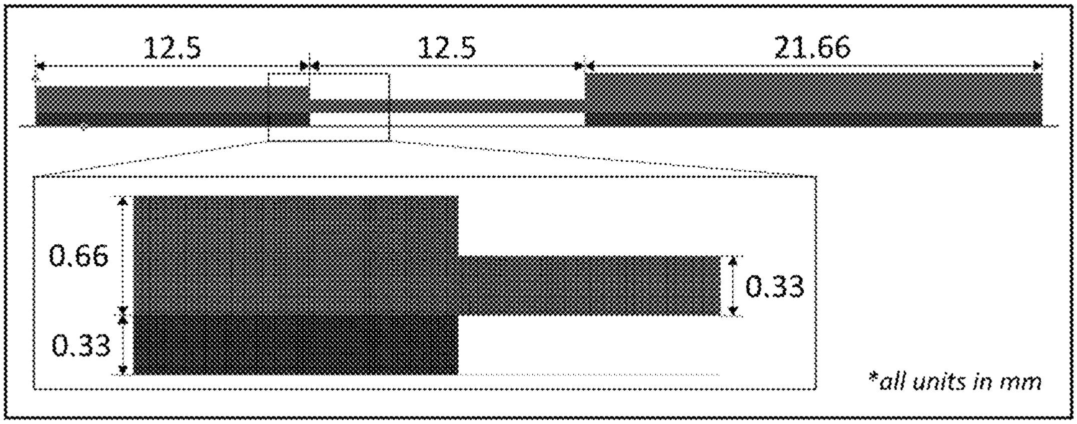

FIG. 14: Meshing of the two-segment robot with a flexible linker. Meshing around the small bilayer and the linker interface of the two-segment robot with a flexible linker. We used a similar meshing at the interface of the larger bilayer and linker. Dry-state dimension of the robot was scaled by the inverse of the curing stretch, $1/\lambda_c$=1/1.2, from the cured state dimension.

Figure 15:
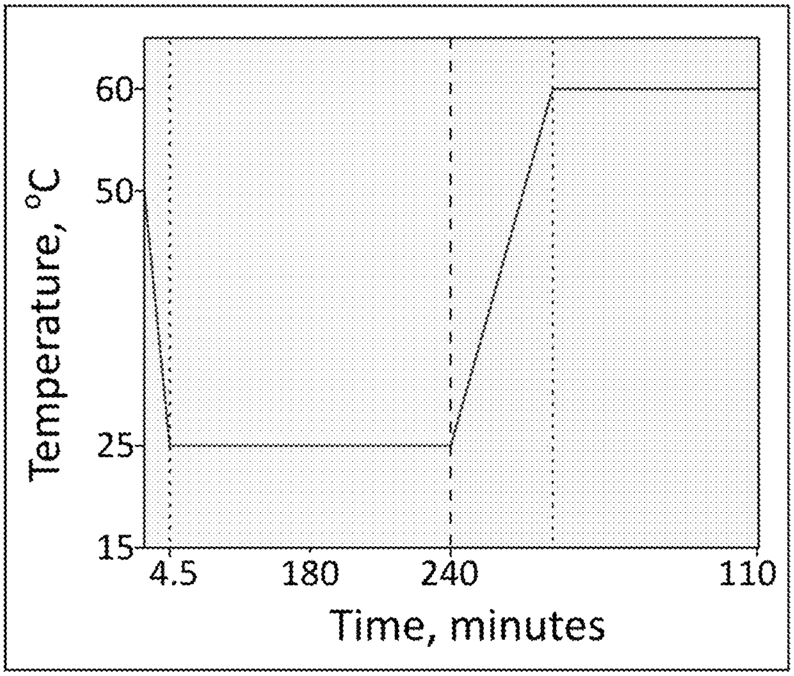

FIG. 15: Temperature profile applied to the two-segment robot with a flexible linker. A plot of the temperature history applied to the two-segment robot for thermal actuation-based locomotion. The blue shaded area represents the cooling half-cycle, and the red represents the heating half-cycle.

Figure 16:
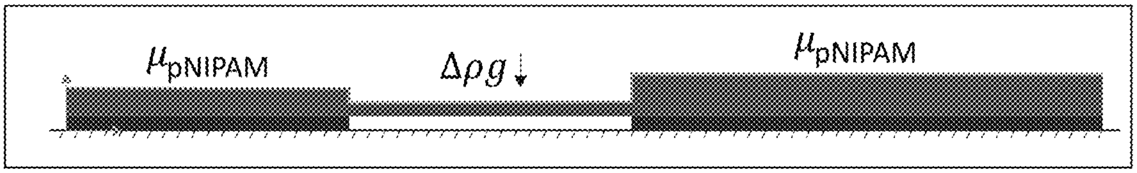

FIG. 16: Boundary conditions, body force, and contact conditions. Applied to the two-segment robot with a flexible linker. The green outline on the pNIPAM indicates the application of chemical potential. We fixed the center of the linker initially during the curing step, and a weak spring connected along the x-axis substituted the fixed pin during the actuation period.

Figure 17:
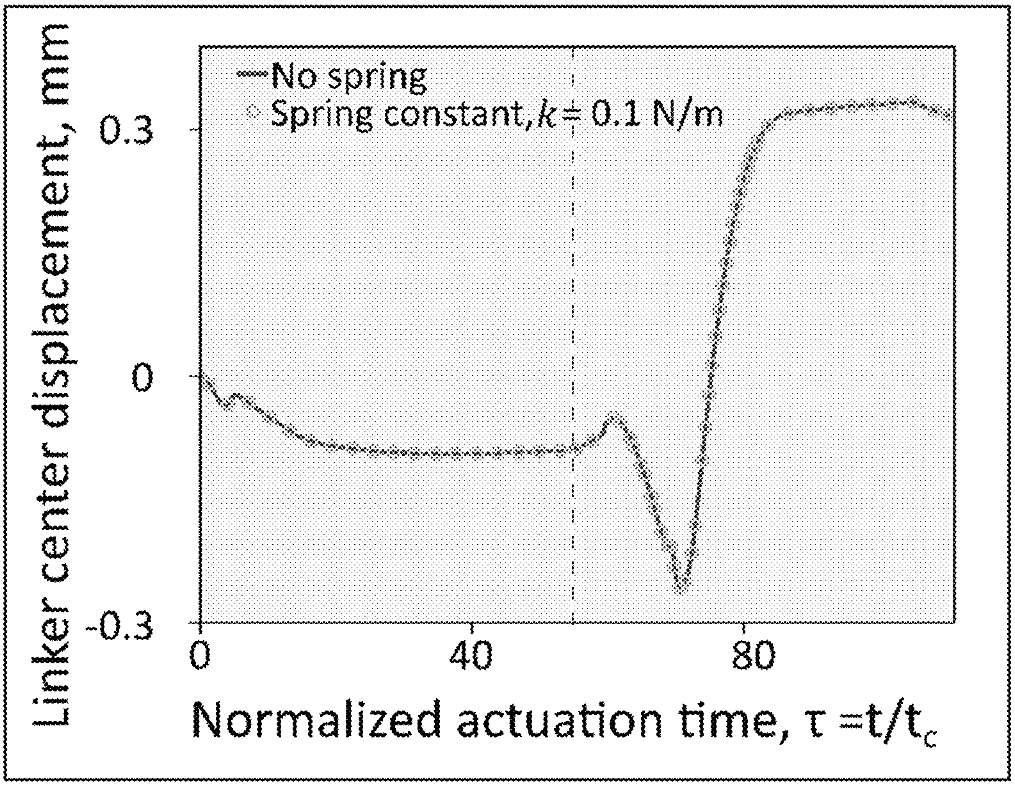

FIG. 17: Effect of the added spring at the center of the linker. A plot of the displacement of the center of the linker of the two-segment robot with a flexible linker without a spring and with a spring of stiffness k=0.1 N/m attached to the linker center during thermal actuation. The blue shaded area represents the cooling half-cycle, and the red represents the heating half-cycle.

Figure 18:
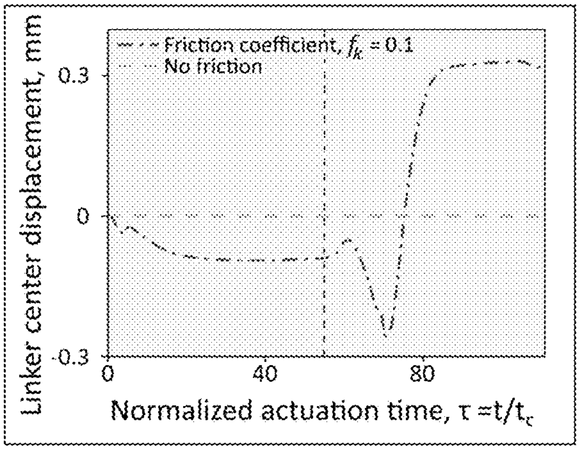

FIG. 18: Effect of Coulomb friction on the locomotion. The plot of the displacement of the center of the linker of the two-segment robot with a flexible linker on a surface with a friction coefficient, $f_k$=0.1, and a surface with no friction. The blue shaded area represents the cooling half-cycle, and the red represents the heating half-cycle.

Figure 19A:
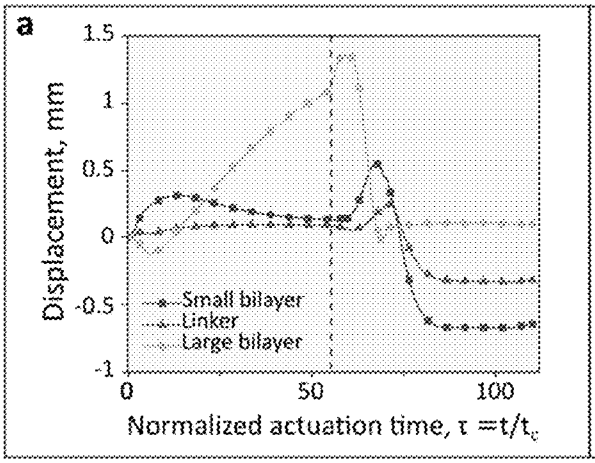
Figure 19B:
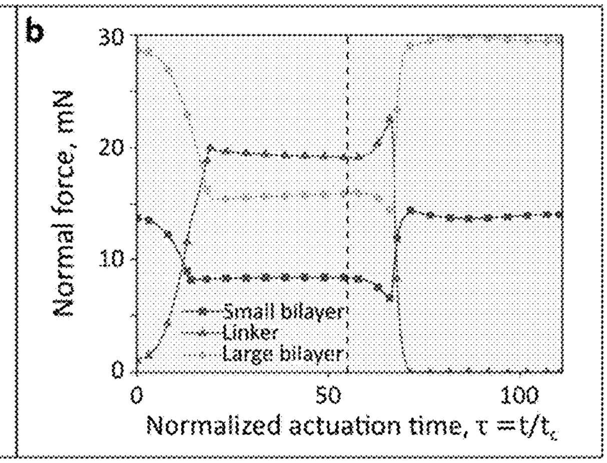

FIGS. 19A-19B: Displacement and normal force of the two-segment robot with interchanged bilayers and a flexible linker. (a) Displacement of the center of the linker and the bilayers, (b) Normal force distribution on the contacting surface of the two-segment robot with interchanged bilayers and a flexible linker configuration over a thermal cycle. The blue shaded area represents the cooling half-cycle, and the red represents the heating half-cycle.

Figure 20:
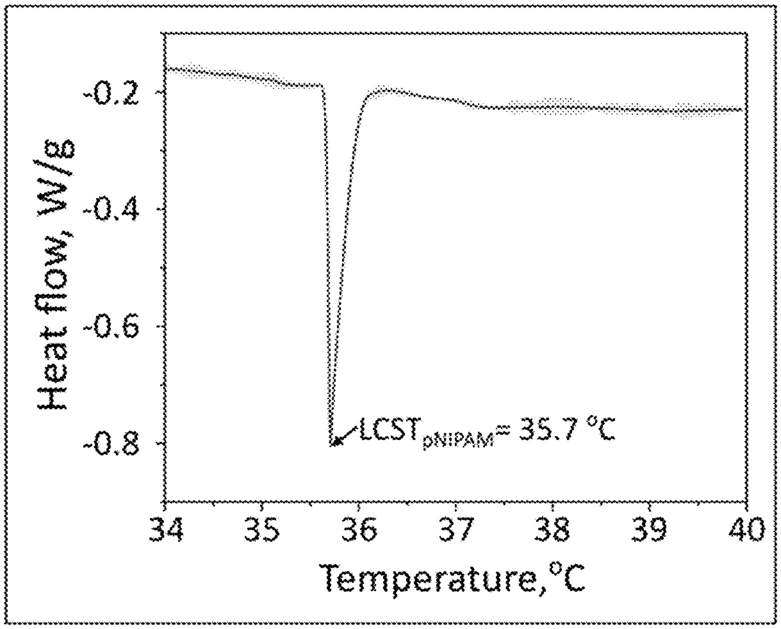
Figures 21A, 21B, 21C, 21D:
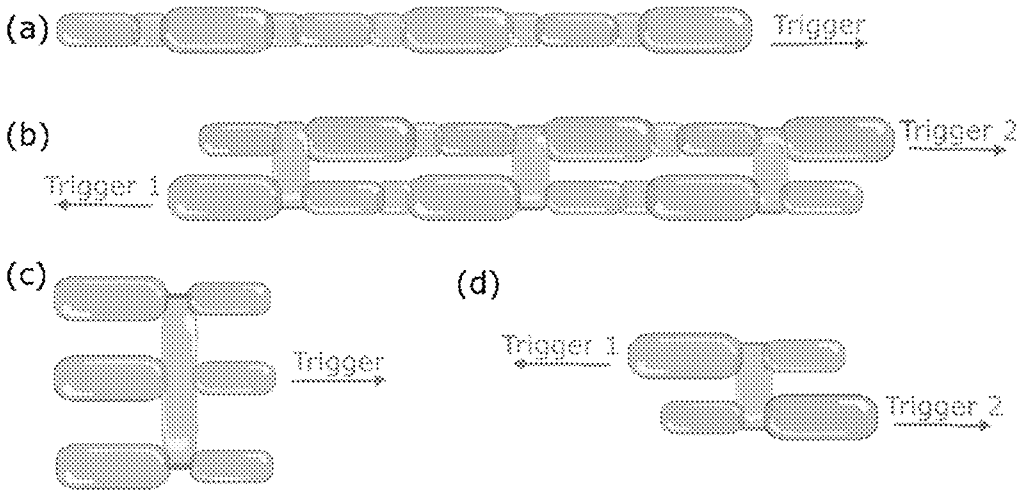

FIG. 20: DSC study of pNIPAM-Laponite hydrogel ink. The LCST is represented by a dip in the experimentally measured plot of heat flow vs. temperature and occurs at 35.7° C. The units of endothermic heat flow are Watts/gram (W/g)

FIGS. 21A-21D are schematic illustrations of further embodiments of the current invention.

Figure 22A:
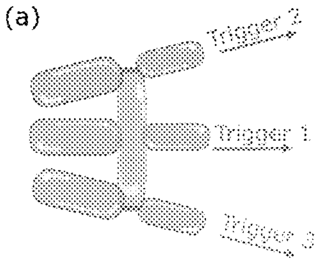
Figure 22B:
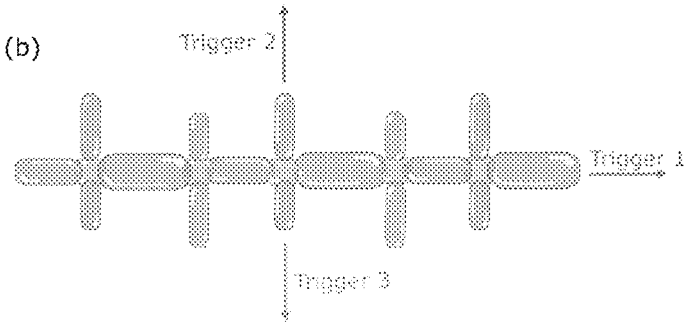

FIGS. 22A-22B are schematic illustrations of further embodiments of the current invention.

Figure 23A:
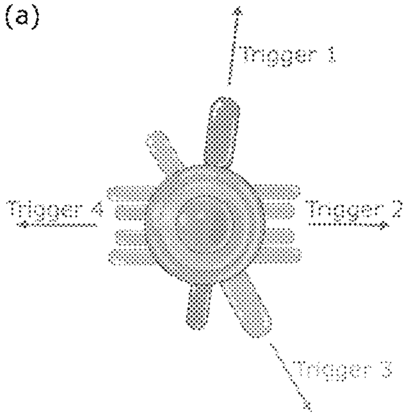
Figure 23B:
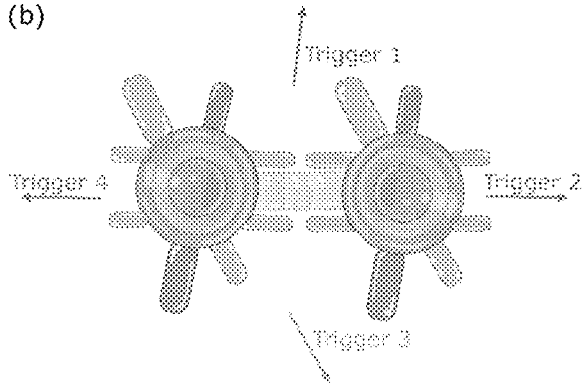

FIGS. 23A-23B are schematic illustrations of further embodiments of the current invention.

Figure 24:
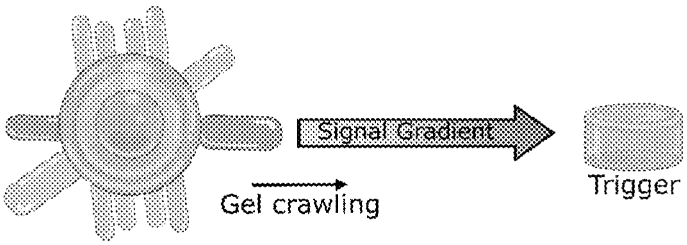

FIG. 24 is a schematic illustration of a further embodiment of the current invention.

Figure 25:
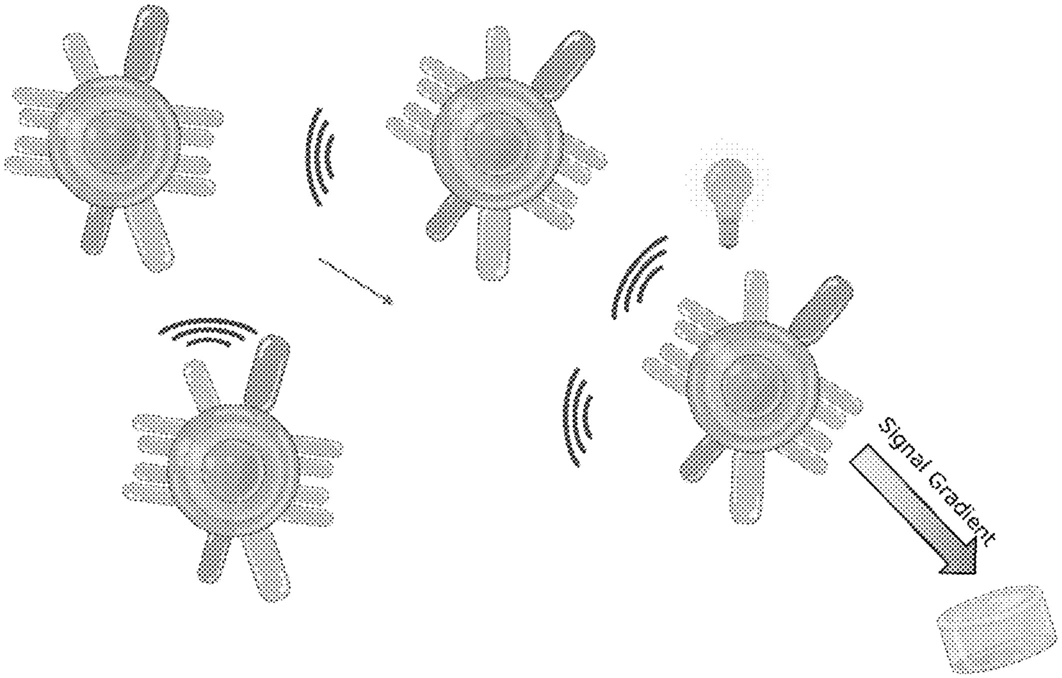

FIG. 25 is a schematic illustration of a further embodiment of the current invention.

Figure 26:
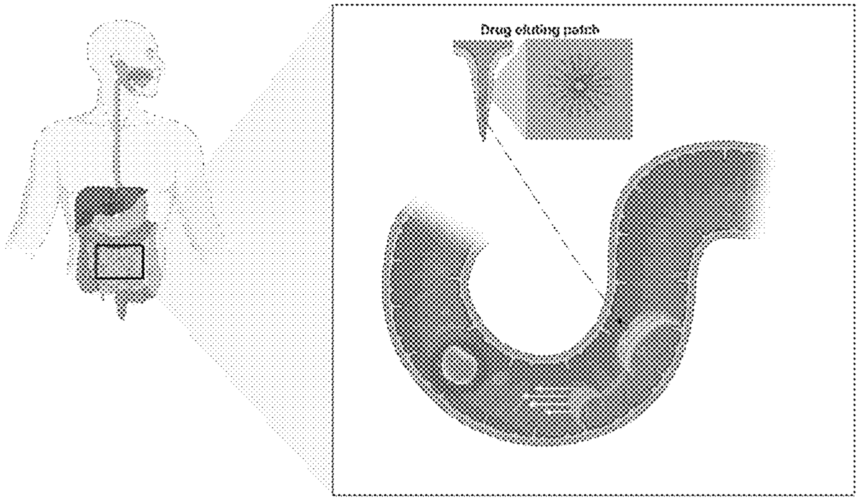

FIG. 26 is a schematic illustration of an application of an embodiment of the current invention.

Figure 27:
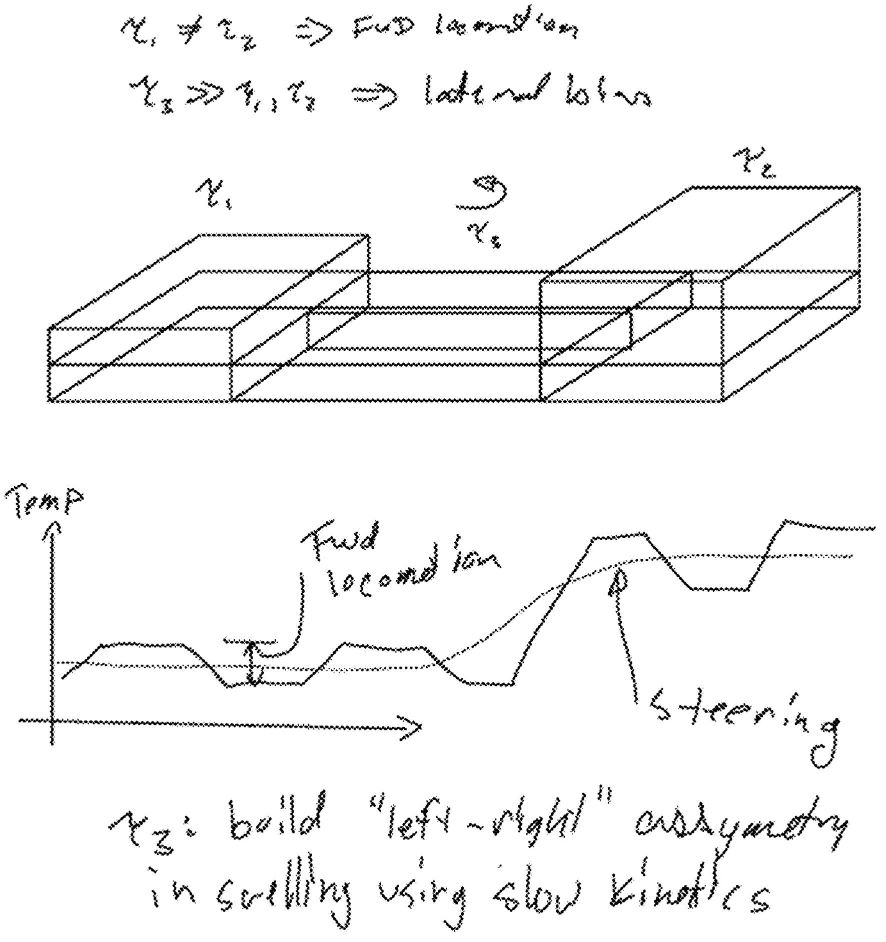

FIG. 27 is a schematic illustration to help explain some further aspects of the current invention.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed, without departing from the broad concepts of the present invention. All references cited anywhere in this specification are incorporated by reference as if each had been individually incorporated.

The term "crawl" refers generally to a translation of the robot across a portion of a surface. It can be thought of in analogy with the motion of a worm across a surface, or the motion of a crawling baby, but it is not limited to be exactly the same these analogous cases.

The term "active material" means that it changes its dimensional boundaries such as by, but not limited to, inflating and deflating.

The term "passive material" means that it has no change, or a relatively small amount of change of its dimensions as compared to a corresponding active material used in the same robot segment.

The term "local environmental stimulus" refers to an environmental condition local to the robot that cause the changes in the dimensional boundaries of the active materials within the robot.

The term "cyclically change" is intended to refer to periodic changes in the time domain. The term period is a period of the time domain cycle.

The term "electromagnetic field intensity" is intended to have a broad meaning without limitation to any region of the spectrum. For example, it can include, but is not limited to, radio frequency regions, infrared regions, visible regions, ultraviolet regions, x-ray regions, etc. of the electromagnetic spectrum.

In an embodiment of the current invention, we describe the use of systematic and asynchronous changes in robot morphology, driven by the transient swelling and deswelling of connected gel segments, to break the spatial (fore-aft) symmetry of contact forces and direct motion on flat surfaces. We show that symmetry is spontaneously broken simply by asymmetry in contact surface forces caused by the structural design of the robot without the need for additional patterning on the gel surface or substrate. In an embodiment, we used gel bilayers with different thickness ratios and lateral dimensions to induce spatiotemporal asymmetries in swelling and deswelling. In some embodiments, we also used a suspended linker with different stiffness and varied the number of bilayer segments and linker pattern to manipulate contact force asymmetry and tune robot displacement. In an embodiment, we fabricated our robots by direct ink writing (DIW), a 3D printing technique that uses pressure-based extrusion for layer-by-layer assembly of multiple materials. However, the general concepts of the current invention are not limited to only that fabrication method. We characterized the robots according to some embodiments over multiple heating and cooling half-cycles and simulated their thermo-chemo-mechanical behavior using finite element analysis. We developed a conceptual framework for designing tunable, scalable, and versatile untethered stimuli-responsive locomotors that move unidirectionally. (10, 22-29) However, this is an example according to an embodiment of the current invention to facilitate the description and explanation of some concepts of the invention. The general concepts of this invention are not limited to this, and the other examples described in detail.

A multisegmented robot 100 according to an embodiment of the current invention is shown schematically in FIGS. 1A-1E. The multisegmented robot, e.g., FIG. 1B, includes a first robot segment 102 (also referred to a bilayer) that includes a first layer of active material 104 at least one of integral with, attached to or formed on a first layer of passive material 106; a second robot segment 108 spaced apart from the first robot segment 102, the second robot segment 108 including a second layer of active material 110 at least one of integral with, attached to or formed on a second layer of passive material 112; and a tether 114 connecting the first and second robot segments (102, 108). The terms "tether" and "linker" are used interchangeably herein to refer to the same structure. As can be seen in the examples of FIGS. 1A-1E, the first and second layers of active material (104, 110) are each cyclically swellable and deswellable in response to a corresponding cyclically changing local environmental stimulus thereby causing each of the first and second segments (102, 108) to cyclically change shape.

FIG. 1B illustrates a multisegmented robot 200 according to another embodiment of the current invention. The multisegmented robot 200 is substantially the same as multisegmented robot 100 except that the soft linker 114 is replaced by stiff linker 214.

The first layer of passive material 106 has a surface arranged such that at least a portion thereof contacts a surface over which the robot may crawl during the cyclically changing the local environmental stimulus, the second layer of passive material 112 has a surface arranged such that at least a portion thereof contacts the surface over which the robot may crawl during the cyclically changing the local environmental stimulus, and the second robot segment 108 has a greater frictional resistance to movement over a period of the cyclically changing local environmental stimulus than a frictional resistance to movement of the first robot segment 102 over the period of the cyclically changing local environmental stimulus resulting in translational motion of the robot along a direction from the first robot segment to the second robot segment. (See, FIG. 1C, for example.)

The cyclically changing local environmental stimulus of the multisegmented robot 100, 200 can be at least one of a local temperature, a local pH, a local electromagnetic field intensity, a local chemical composition, a disease marker or a local biomolecular concentration, for example.

In some embodiments of the multisegmented robot 100, 200 the first and second layers of active materials (104, 110) each can be or can include a gel. In some embodiments, the gel can be selected from the group consisting of thermo-responsive poly (N-isopropylacrylamide) (pNIPAM), polyacrylic acid (pAAc), poly(imidazoled glycidyl methacrylate-co-diethyleneglycol methyl ether methacrylate), an LCST and/or UCST responsive acrylate, a magnetic field responsive ferrogel, a gel having crosslinked magnetic particles, a light responsive spirobenzopyran, cyclodextrin, cinnamic acid, coumarin, an azobenzene derivative gel, a gel seeded with gold nanorods, carbon nanotubes, copper chlorophyllin that undergo a photothermal effect, an electric field responsive polyelectrolyte gel, a chemically and/or biochemically responsive DNA polymerization gel, an oscillatory gel functionalized by tris(bipyridine)ruthenium(II) ([Ru $(bpy)_3]^{2+}$ (Undergoing Belousov Zhabotinsky (BZ) reaction), a glucose sensitive gel, an enzyme sensitive gel, a gel reacting to alkaline phosphatase.

In some embodiments, the first and second layers of passive materials (106, 112) each can be or include a polymer that includes an acrylamide, a polysaccharide, a polyethylene glycol-based gel or material, or a hydrogel, for example. In some embodiments first and second layers of passive materials (106, 112) can each be or include polyacrylamide (pAAM).

In some embodiments, at least one of the first and second segments (102, 108) includes a material additive that alters a response of at least one of the first and second layers of active material (104, 110) to said corresponding cyclically changing local environmental stimulus. In some embodiments, at least one of the first and second segments (102, 108) includes a material additive that alters the cyclically changing local environmental stimulus.

In some embodiments, the tether (114, 214) consists essentially of a passive material. In some embodiments, the tether (114, 214) includes a patterned structure of passive and active materials. (See, for example, FIGS. 5A-5D.)

In some embodiments, the dimensions of the first and second active layers (104, 110) and the first and second passive layers (106, 112) are selected to result in the greater frictional resistance to movement of the second segment 108 compared to the frictional resistance to movement of the first robot segment 102.

In some embodiments, a material of the first passive layer 106 and a material of the second passive layer 112 are selected to result in the greater frictional resistance to movement of the second segment 108 compared to the frictional resistance to movement of the first robot segment 102.

In some embodiments, the multisegmented robot 100, 200 further includes a third robot segment disposed proximate and displaced from the second robot segment on a side of the second robot segment opposite the first robot segment so as to form a linear arrangement of the first, second and third robot segments, the third robot segment including a third layer of active material at least one of integral with, attached to or formed on a third layer of passive material; a second tether connecting the second and third robot sections; a fourth robot segment disposed proximate and displaced from the third robot segment on a side of said third robot segment opposite the second robot segment so as to form a linear arrangement of the first, second, third and fourth robot segments, the fourth robot segment including a fourth layer of active material at least one of integral with, attached to or formed on a fourth layer of passive material; and a third tether connecting the third and fourth robot segments. (Sec, e.g., FIG. 21A). The third and fourth layers of active material are each cyclically swellable and deswellable in response to a corresponding cyclically changing local environmental stimulus thereby causing each of the third and fourth segments to cyclically change shape, the third layer of passive material has a surface arranged such that at least a portion thereof contacts the surface over which the robot may crawl during the cyclically changing of the local environmental stimulus, the fourth layer of passive material has a surface arranged such that at least a portion thereof contacts the surface over which the robot may crawl during the cyclically changing the local environmental stimulus, and the fourth robot segment has a greater frictional resistance to movement over a period of the cyclically changing local environmental stimulus than a frictional resistance to movement of the third robot segment over the period of the cyclically changing local environmental stimulus resulting in translational motion of the robot along a direction from the first robot segment to the fourth robot segment.

In some embodiments, the multisegmented robot 100, 200 further includes a third robot segment disposed proximate and displaced from the first and second robot segments, the third robot segment including a third layer of active material at least one of integral with, attached to or formed on a third layer of passive material; a fourth robot segment disposed proximate and displaced from the first, second and third robot segments, the fourth robot segment including a fourth layer of active material at least one of integral with, attached to or formed on a fourth layer of passive material; a second tether connecting the third and fourth robot segments; and a third tether one of integral with or attached to the first and second tethers. (See FIGS. 21B and 21D, for example.) The third and fourth layers of active material are each cyclically swellable and deswellable in response to a corresponding cyclically changing a second local environmental stimulus thereby causing each of the third and fourth segments to cyclically change shape, the third layer of passive material has a surface arranged such that at least a portion thereof contacts the surface over which the robot may crawl during the cyclically changing the second local environmental stimulus, the fourth layer of passive material has a surface arranged such that at least a portion thereof contacts the surface over which the robot may crawl during the cyclically changing the second local environmental stimulus, the fourth robot segment has a greater frictional resistance to movement over a period of the cyclically changing second local environmental stimulus than a frictional resistance to movement of the third robot segment over the period of the cyclically changing second local environmental stimulus resulting in translational motion of the robot along a direction from the third robot segment to the fourth robot segment, and the third and fourth robot segments form a line substantially parallel to the first and second robot segments with a direction of motion opposite thereof.

In some embodiments, the multisegmented robot 100, 200 further includes a third robot segment disposed proximate and displaced from the first and second robot segments, the third robot segment including a third layer of active material at least one of integral with, attached to or formed on a third layer of passive material; a fourth robot segment disposed proximate and displaced from the first, second and third robot segments, the fourth robot segment including a fourth layer of active material at least one of integral with, attached to or formed on a fourth layer of passive material; a second tether connecting the third and fourth robot segments; and a third tether one of integral with or attached to the first and second tethers. (See, e.g., FIGS. 22A and 22B.) The third and fourth layers of active material are each cyclically swellable and deswellable in response to a corresponding cyclically changing a second local environmental stimulus thereby causing each of the third and fourth segments to cyclically change shape, the third layer of passive material has a surface arranged such that at least a portion thereof contacts the surface over which the robot may crawl during the cyclically changing the second local environmental stimulus, the fourth layer of passive material has a surface arranged such that at least a portion thereof contacts the surface over which the robot may crawl during the cyclically changing the second local environmental stimulus, the fourth robot segment has a greater frictional resistance to movement over a period of the cyclically changing second local environmental stimulus than a frictional resistance to movement of the third robot segment over the period of the cyclically changing second local environmental stimulus resulting in translational motion of the robot along a direction from the third robot segment to the fourth robot segment, and the third and fourth robot segments form a line at an angel greater than zero degrees and less than 180 degrees to the first and second robot segments with a direction of motion along said line from the third robot segment to the fourth robot segment. In some embodiments, the third and fourth robot segments form the line substantially perpendicular to the first and second robot segments.

In some embodiments, the multisegmented robot 100, 200 can further include a cargo carried by the multisegmented robot. In some embodiments, the cargo can include at least one of an electronic device, an opto-electronic device, an optical device, a medical imaging contrast agent, a diagnostic agent, an imaging sensor, an analyte measurement sensor, a drug delivery agent or a therapeutic agent, for example. In some embodiments, the cargo can include a communications device that can receive and send signals to other robots. In some embodiments, the communications device can include at least one of a radio frequency transmitter or an optical transmitter and can further include at least one of a radio frequency receiver and an optical receiver.

Another embodiment of the current invention is directed to a network of multisegmented robots. (See, e.g., FIG. 25.) The network of multisegmented robots can include one or more multisegmented robots according to the current invention, such as, but limited to, the examples described above. In some embodiments, the network of multisegmented robots includes a plurality of multisegmented robots according to an embodiment of the current invention such that each multisegmented robot further includes a communications device. Each communications device can include a radio frequency transmitter and/or an optical transmitter and a radio frequency receiver and/or an optical receiver such that the plurality multisegmented robots are configured to communicate with each other to form the network of multisegmented robots.

The following describes some embodiments in more detail. The general concepts of the current invention are not limited to these specific embodiments.

Results

Design and Fabrication of Multisegmented Bilayer Gel Robots

Crawling via cycles of musculoskeletal traveling waves provides a common and effective means of locomotion for organisms across taxa, including snakes, salamanders, and inchworms. (30-35) Usually, such traveling waves emerge due to a spatiotemporal pattern of descending neural commands (i.e., from a central pattern generator (36)) that drives muscles to create kinematic phase differences along a fore-aft body axis.

Here, we propose a locomotion strategy that exploits the geometry of actuators by engineering morphological asymmetries in lateral dimensions and thickness of bilayers to generate the requisite fore-aft phase differences during swelling and deswelling without needing to use any independent stimuli. We designed morphological gradients along the fore-aft axis of the soft robotic chassis, which lead, in turn, to gradients in actuator dynamics, ultimately instantiating a wave-like locomotor gait that only requires a single input.

We designed multisegmented robots with two bilayers of different morphology and bilayer ratios connected by a suspended linker (FIG. 1A). The bilayers were composed of a thermally responsive swelling gel (active material) and a non-swelling gel (passive material). We used DIW, an extrusion-based 3D printing technique, to fabricate our bilayers and robots. We used NIPAM as our active ink and acrylamide (AAM) as our passive ink. We made the inks by mixing the monomers with a shear-thinning additive Laponite nanoclay, in water. After printing, we crosslinked the structures by UV exposure. (10, 29) From our differential scanning calorimetric (DSC) measurements (FIG. 20), we observed that the lower critical solution temperature (LCST) of pNIPAM was 35.7° C.

We introduced a suspended central linker to couple the asymmetric bilayer segments. As opposed to a non-suspended linker that maintains continual contact with the substrate, we could tune the contact area between the suspended linker and the substrate based on its stiffness (described later). We developed a sacrificial ink composed of an aqueous Laponite solution that supported a second gel layer during fabrication. Since Laponite did not crosslink during UV curing, it dissolved readily when the structure swelled in water to create the suspended linker. (FIG. 1B).

Following the sacrificial layer dissolution, we conducted thermal cycling of our robots in water by setting the temperature to 25° C. for the cooling half-cycle and 60° C. for the heating half-cycle (FIG. 1C). We heated the actuation setup well above the LCST to ensure that the temperature of the gel itself was above the LCST since there were thermal gradients in the water. We modified linker stiffness, morphology, and the number of bilayer segments to investigate their influence on the asymmetry and crawling displacement of the robots (FIGS. 1D, 1E).

The Morphology of the Bilayers can be Tuned During Swelling and Deswelling

Figures 2A, 2B, 2C:
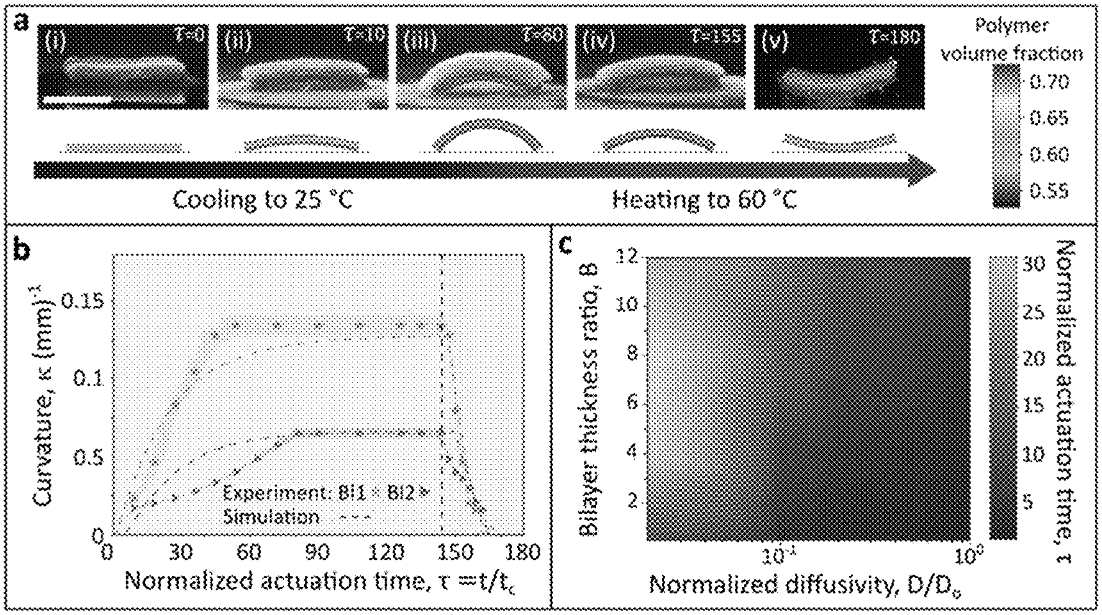
FIGS. 2A-2C: Tuning actuation time and curvature of the bilayers by varying thickness ratio during thermal cycling. (a) Experimental images and simulation snapshots of the bending of the 0.8 mm pNIPAM-0.4 mm pAAM bilayer versus normalized actuation time defined as $\tau$=t/$t_c$, (where $$t_c = l_c^2/D_o,\ l_c = 1\ \text{mm},\ D_o = 5\times10^{-9}\ \text{m}^2/\text{s}).$$

The relative transient swelling characteristics of the two bilayers were important to achieve the desired morphological asymmetry of the crawling robot. We measured the transient curvature of rectangular bilayers with varying dimensions over a thermal cycle (cooling and heating half-cycles). We used 10 mm×15 mm rectangular bilayers with two thicknesses of the pAAM layer (0.4 mm, 0.8 mm) and four thicknesses of the pNIPAM layer (0.4 mm, 0.8 mm, 1.2 mm, and 1.6 mm). We plotted the radius of curvature of the bilayers during the heating and cooling half-cycle against the time t, normalized by the characteristic diffusion time $t_c$ of the bilayer: $\tau=t/t_c$. We defined the characteristic diffusion time as $$t_c = l_c^2/D_o,$$

where $l_c$=1 mm is the characteristic diffusion length of the bilayer and $D_o=5\times10^{-9}$ $m^2/s$ is the self-diffusivity of water at 60° C. (37) During the cooling half-cycle, the thinnest bilayer reached its equilibrium curvature fastest because of its smaller characteristic diffusion length. It also had the highest curvature of all the bilayers because it had the lowest bending stiffness. (FIGS. 2A, 2B, and FIG. 22). We observed that during the cooling half-cycle, the normalized swelling time varied widely ($\tau$=50-110) because of the large difference in the pNIPAM thickness across the bilayers. A thicker pNIPAM layer results in a larger characteristic diffusion length and bending modulus. During the heating half-cycle, the bilayers deswelled twice as fast ($\tau$=150-180). (38)

We applied finite element analysis (FEA) of the swelling- and deswelling-induced transient bending of the bilayers to determine the swelling and deswelling properties of the hydrogels (Table 2). We described the rapid deswelling of pNIPAM by modifying the constitutive model to include two different diffusivities for the swelling and deswelling process. We applied FEA to investigate the effects of material and geometric properties of the bilayer on the actuation time, defined as the time required to reach 63.2% of the equilibrium curvature (FIG. 2C). The actuation time was most sensitive to the diffusivity of the pNIPAM and the bilayer thickness ratio. Bilayers with a smaller thickness ratio and a larger diffusivity for the active material produced shorter actuation times.

The Flexible Linker and Morphology of the Bilayers Break Symmetry

We hypothesized that two dissimilar gel bilayer segments connected by a suspended linker would generate asymmetry in contact forces leading to unidirectional robot displacement during thermal cycling. We utilized the bilayer thermal cycling data to choose two bilayers with the greatest curvature difference. We picked a small (0.8 mm pNIPAM-0.4 mm pAAM) bilayer and a large (1.2 mm pNIPAM-0.4 mm pAAM) bilayer and connected them with a suspended flexible pNIPAM linker. The specific lateral and thickness dimensions of the robot are in FIG. 9A. We thermally stimulated the robot in water by switching the temperature between 25° C. and 60° C.

During the cooling half-cycle, the robot was allowed to swell at room temperature (25° C.), and we observed swelling-induced bending in both bilayer segments. Simultaneously, the suspended linker swelled and sagged to touch the underlying surface along with the outer edge of both bilayers. This sagging caused the linker to act as an anchor and move the bilayers towards it by the end of the half-cycle (FIG. 3A(i-iii)). Once we switched to the heating half-cycle, the robot transitioned from its swollen-bent state to a deswollen-flattened state (FIG. 3A(iii-v)). The linker straightened and achieved its original suspended state while the two bilayers deswelled asynchronously. During deswelling, due to size and curvature asymmetry between the larger and smaller bilayer, the anchor was transferred from the linker to the larger bilayer. As a result, the robot moved unidirectionally as the small bilayer and linker were drawn toward the larger bilayer.

Figures 3A, 3B, 3C, 3D, 3E, 3F:
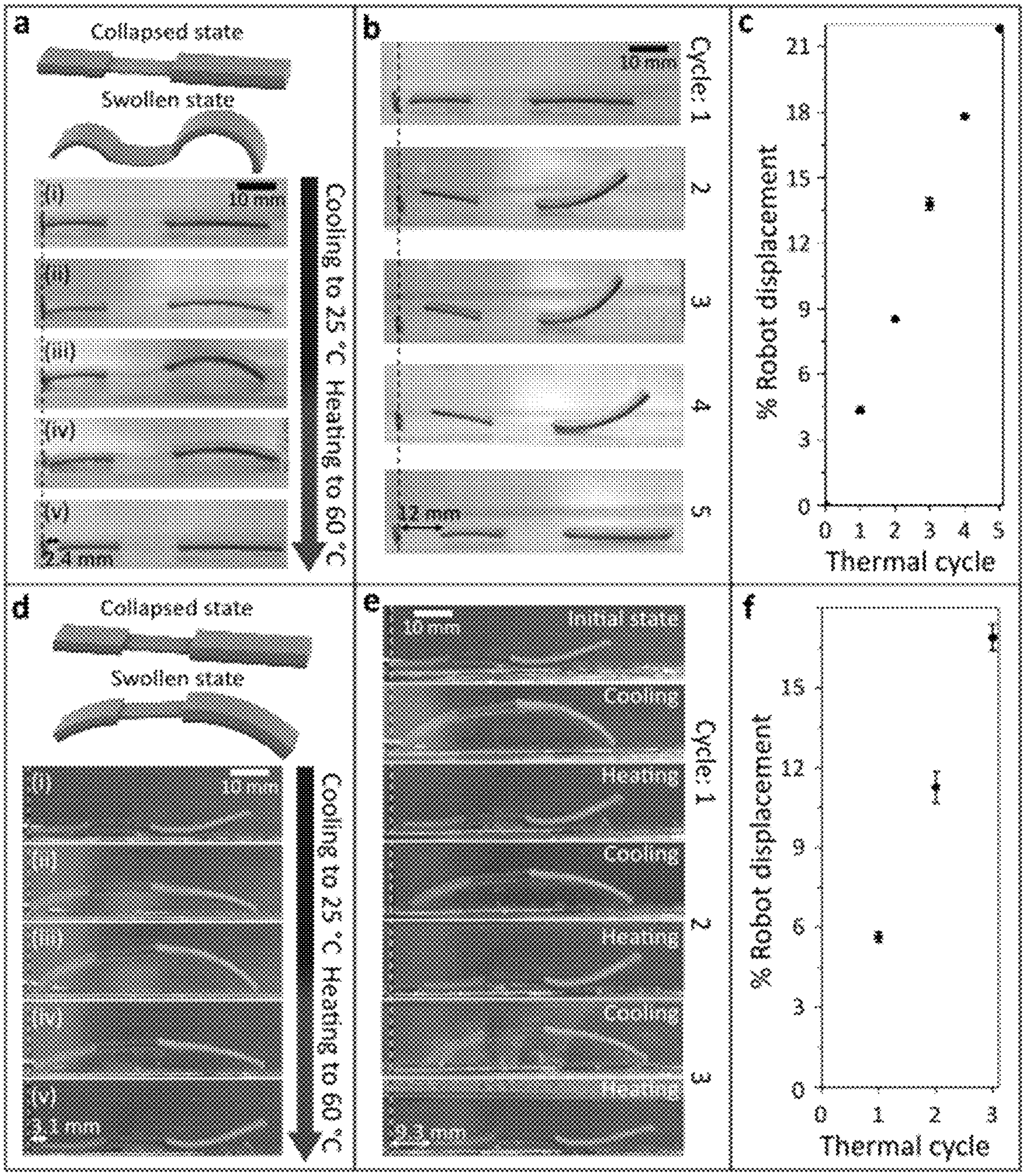

We subjected this robot to five thermal cycles and measured the displacement of the robot after each cycle (FIGS. 3B, 3C). We observed that our robot crawled consistently in the direction of the larger bilayer, moving approximately 4.4% body length/cycle. The final curvature of the robot segments varied slightly with each cycle, likely due to differences in the reorganization of the molecular chains of the crosslinked polymer and hydrogen bonding that occur between heating and cooling half-cycles. Also, the pNIPAM layer deswells beyond its cured state length and causes the bilayers to bend in the opposite direction as compared to its swollen state. (39)

Varying the Linker Stiffness Speeds Up the Gel Crawler

We hypothesized that the stiffness of the linker would strongly influence the morphology and, consequently, the gait and contact forces of the robot. To study this effect, we printed the same two-segment robot with identical dimensions but replaced the flexible pNIPAM linker with a stiff pAAM linker (FIGS. 3D, 3F). Notably, during the cooling half-cycle, the stiff linker held its flat shape. The stiff linker remained suspended between the bilayers and did not play any role in anchoring. As a result, there was an increase in the net contact force asymmetry between the larger and smaller bilayer, and the unidirectional displacement increased from 4.4 to 5.6% body length/cycle), proving our hypothesis.

We also confirmed that the locomotion direction of the robots depends on the relative orientation of the small and large bilayers. We thermally stimulated both the flexible and stiff linker robots over 20 thermal cycles and observed consistent unidirectional motion in the direction of the larger bilayer (FIGS. 9D, 9F).

Asymmetry in Contact Forces Generates Unidirectional Motion

We obtained insight into our experimental findings by performing finite element analysis of the thermo-chemo-mechanical behavior of the robot during thermal cycling. The constitutive model by Chester et al. assumed that the hydrogel was in a dry polymer state at the beginning of the simulation. (40) In contrast, the hydrogels that are fabricated by DIW are in a partially swollen state. To achieve this initial swollen configuration, we simulated the free swelling of both the pNIPAM and pAAM materials at a reference temperature of 50° C. as described in the Supplementary Materials. The effects of gravity and buoyancy were prescribed by applying a body force, $b_y=\Delta\rho g$, where $\Delta\rho=100$ kg/m3 is the difference in the density between the polymer and water and g is the gravitational acceleration. We discretized the bottom surfaces of all three segments of the robot (FIG. 16) using contact surface elements. We assumed a rigid surface underneath the hydrogel segments to prevent interpenetration. The surface was assumed to have a frictional coefficient, $f_k=0.1$, to describe the frictional sliding of the robot during the thermal cycle. For low sliding velocities, most literature reported the coefficient of friction of pAAM hydrogel to be below 0.1. (41) We chose $f_k=0.1$ to ensure a sufficient difference in the friction force between the segments to produce locomotion.

We lowered the temperature from 50° C. to 25° C. at a rate of 1.67° C./min and held it at 25° C. for 2.45 hours, then increased the temperature to 60° C. at 0.58° C./min and held it at 60° C. for 2 hours, to simulate the actuation experiments. This temperature ramping caused the thermally responsive pNIPAM to swell during the cooling half-cycle and deswell during heating half-cycle. The swelling strain mismatch between the active pNIPAM and passive pAAM hydrogel caused the bilayer segments to curve downward during cooling, pushing the pNIPAM linker into contact with the surface.

Figures 4A, 4B, 4C, 4D, 4E, 4F:
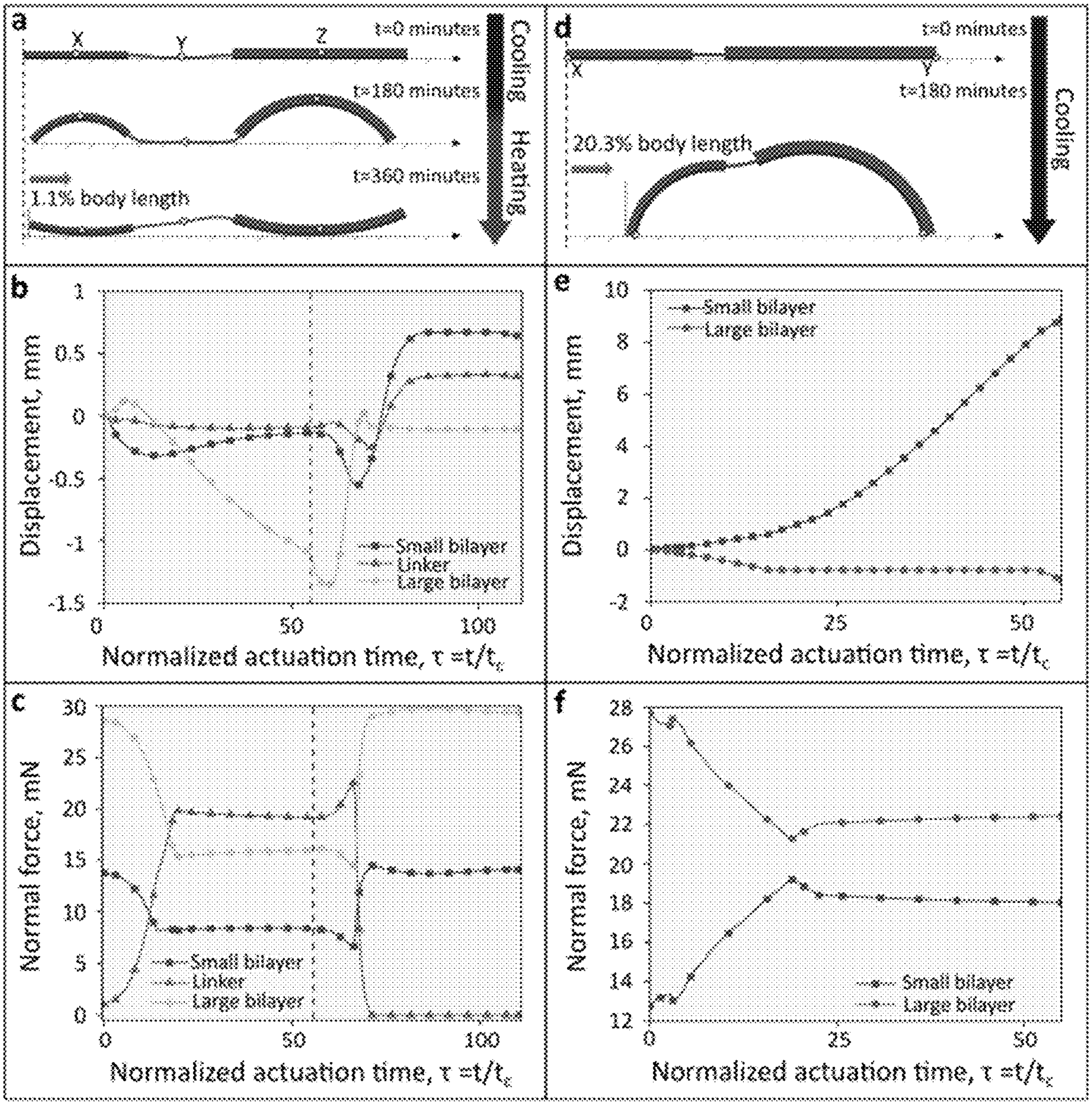

The left edge of the smaller bilayer moved to the right, and the right edge of the larger bilayer moved to the left (FIG. 4A). The opposing motion of the bilayer segment resulted in a minimal 0.1% translation of the center of the linker of the robot. The mismatch in the deswelling strain between pNIPAM and pAAM caused the robot to curve upward during heating. The curving/bending of the larger bilayer and deswelling of the linker pulled the robot to the right and caused a net displacement of 1.1% body length over the thermal cycle. (FIG. 4B).

We plotted the normal force (the force perpendicular to the contact surface) acting on the two bilayer segments and linker to understand the mechanism of forward translation of the hydrogel robot (FIG. 4C). We calculated this by summing the nodal normal forces on the contact surface of an individual segment. The normal force scales with the magnitude of the friction force as the inverse of the Coulomb friction coefficient.

Initially, the normal force was highest for the larger bilayer because it is the largest segment in the robot. During cooling, the bending of the bilayers pushed the linker down on the surface, which caused it to experience the largest normal force and, thus, the largest friction force. The normal force acting on the bilayers decreased approximately by 50%. At the same time, the normal force increased by more than four times than for the linker. The higher normal force caused the linker to act as an anchor and the center of both bilayers to move toward the linker. Increasing the temperature to 60° C. caused both bilayers first to straighten and then curl upward, lifting the linker from the contact surface. The larger bilayer was displaced by −0.1 mm during heating, whereas the smaller bilayer was displaced by 0.63 mm (FIG. 4A). Once again, the larger bilayer experienced the largest friction force of the three segments and acted as an anchor, allowing the smaller bilayer and linker to slide to the right, producing a net forward motion.

We performed three additional finite element simulations to validate the hypothesis for the mechanism of the robot locomotion. First, we repeated the finite element simulations for a frictionless contact surface ($f_k=0.0$). The robot experienced no net translation (FIG. 18). We next changed the frictional anchoring of the robot by switching the positions of the smaller and larger bilayers to produce net motion in the opposite direction. Having the larger bilayer on the left relocated the anchoring point during heating to the left and caused the smaller bilayer to slide to the left, producing a net motion to the left. The stroke (net motion) of the robot was the same in magnitude but opposite in direction as the baseline case, and the friction forces acting on the larger and smaller bilayers and the linker were the same as for the baseline case. We observed the same behavior in our experiments when we turned our flexible linker robot around, thermally stimulated it, and observed it crawl in the opposite direction. We elaborate more on these studies in the SI (FIG. 19A-19B).

Finally, we changed the design of the robot by replacing the pNIPAM linker with a stiffer passive hydrogel linker. We simulated the motion of a robot with a linker that was four times shorter and approximately 46 times stiffer during the cooling half-cycle (FIG. 4D). The bending of the bilayers during cooling lifted the linker from the contact surface, creating an asymmetric arch. We observed that the point of contact of the larger bilayer, point Y, was displaced by 2.1%. In contrast, the point of contact of the smaller bilayer, point X, was displaced by a substantially larger amount, 20.3%, in the opposite direction (FIG. 4E). The normal force was larger at point Y for the larger bilayer than at the contact point X for the smaller bilayer. This asymmetry in contact forces caused point Y to act as an anchor, and the robot translated to the right during the cooling half-cycle (FIG. 4F). The trend observed in our simulations that a robot with a stiffer linker shows higher unidirectional displacement agrees with the experimental observations (FIGS. 3A-3F).

Alternating Linker Patterns and Adding Bilayer Segments Increases Displacement

We studied the dependence of the number of bilayer segments and the linker pattern on the morphology and displacement of gel crawlers. We hypothesized that these factors would induce a larger asymmetry between the bilayer segments, increasing the displacement of the robot. We varied the number of bilayer segments of the robots from two to four (FIGS. 5A, 5B; FIGS. 10, 11). Taking inspiration from an accordion, we also redesigned the linker from the fully pNIPAM or pAAM composition (FIGS. 3A-3F) to a combination of alternating pAAM and pNIPAM strips, as shown in FIGS. 5A-5D. We hypothesized that the alternating geometry would allow the linker to elongate while maintaining its shape. We stimulated all the robots across multiple thermal cycles, and the results are discussed below.

Figures 5A, 5B, 5C, 5D:
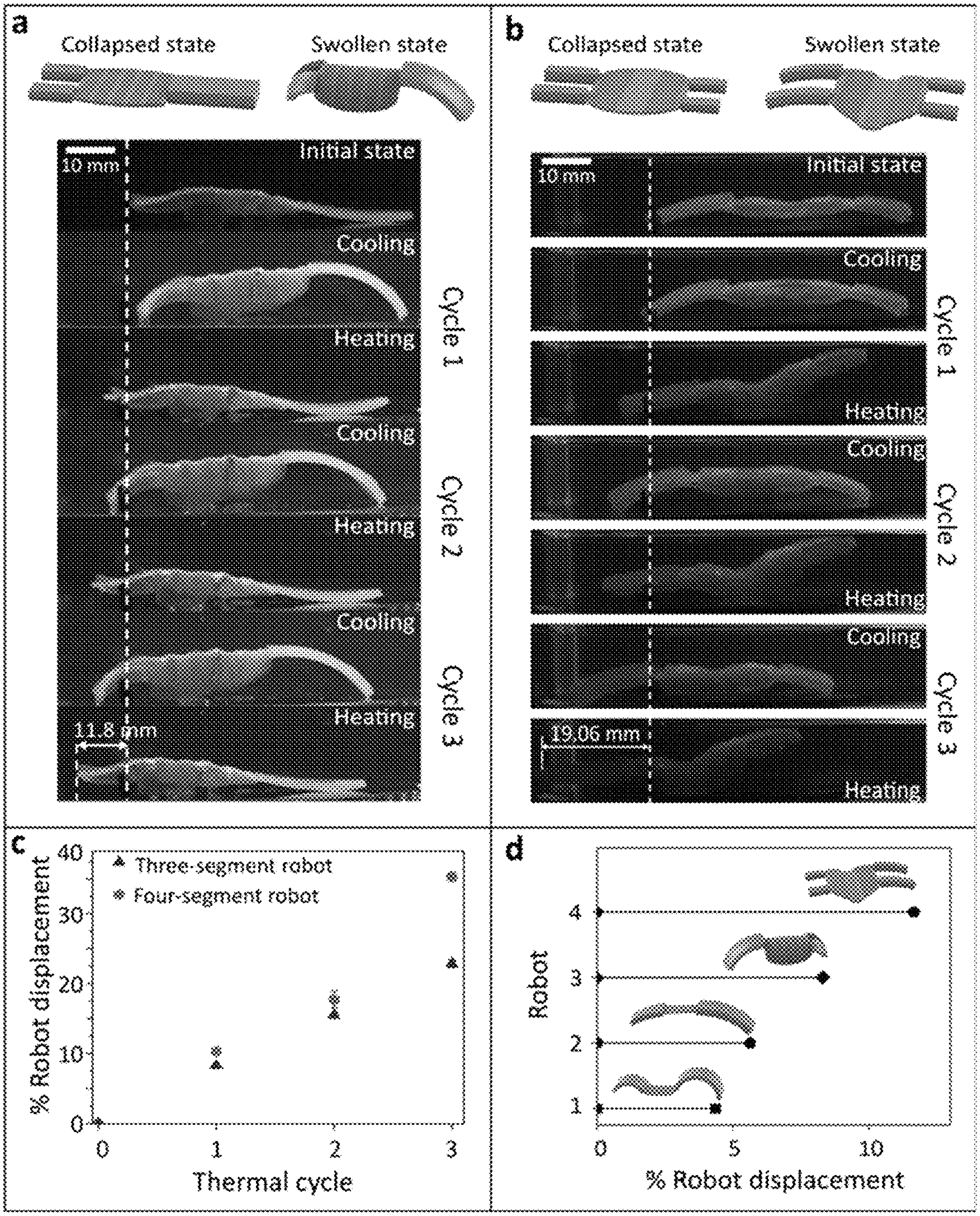
Figures 10A, 10B, 10C, 10D:
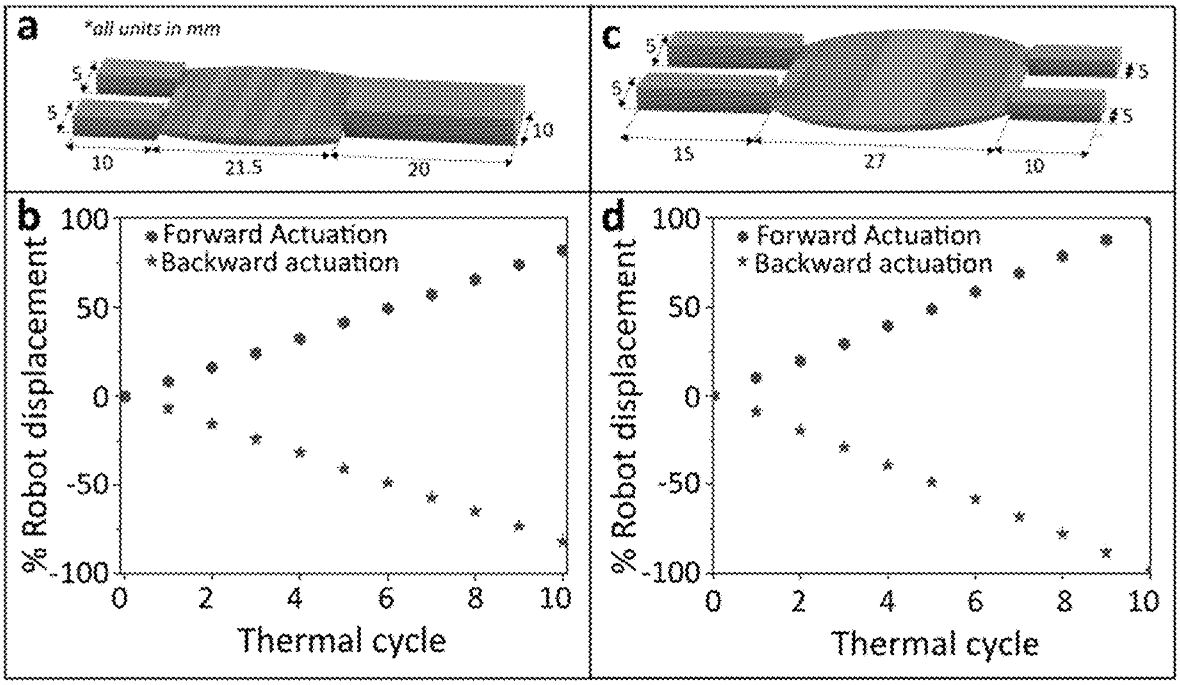

First, we 3D printed a three-segment robot with an alternating linker (FIG. 10A). This gel robot consisted of two small and one large bilayer segment connected by a linker composed of five stripes of pAAM and six stripes of pNIPAM. During the cooling half-cycle, the linker elongated and had minimal anchoring to the contact surface, effectively behaving like a stiff linker (FIG. 5A). During the heating half-cycle, an asymmetry was induced both by the morphological differences in the bilayer curvature and the uneven distribution of the two small bilayer segments. We observed a stick-slip motion and a large displacement of 7.63% body length/cycle. Also, remarkably, the robot moved unidirectionally towards the two smaller bilayers due to the increase in contact area on the side of the smaller bilayers. We also performed a 20-thermal cycle study on this gel robot to confirm consistent unidirectional motion (FIG. 10B). We also compared its displacement to a similar two small and one large bilayer segment robot but with a flexible pNIPAM linker (FIGS. 11A-11C). Since this linker sags and has high contact area with the underlying surface during the cooling half-cycle, the displacement is reduced to 3.9% body length/cycle.

Next, we 3D printed a four-segment robot with an alternating linker (FIG. 10C). This gel robot consisted of two small and two large bilayer segments connected by a linker composed of two stripes of pAAM and three stripes of pNIPAM. During the cooling half-cycle, the linker again elongated and had minimal anchoring to the contact surface, also effectively behaving like a stiff linker. Since the contact area is larger towards the two larger bilayers, the robot consistently moves in that direction and displacement was high, measured at 12.2% body length/cycle (FIGS. 5C, 5D, 10D). These studies confirm that the manipulation of normal force asymmetry can be manipulated by varying the morphology and relative contact area of the bilayers and linker.

Discussion

We have described and validated a mechanism for untethered unidirectional crawling of multisegmented gel robots on flat unpatterned substrates according to some embodiments of the current invention. The mechanism relies on a spatial morphological gradient along the fore-aft axis, which in turn leads to an asymmetry in contact forces of gel segments and linkers, leading to unidirectional locomotion. Using thermal cycling of a model gel robot consisting of two bilayer segments with either a stiff or flexible linker, we characterize the mechanism experimentally and compare the results to FEA simulations with good agreement. We observed consistently that the magnitude and asymmetry of contact forces between different parts of the robot and the underlying surface are important factors that determine the extent of unidirectional displacement. Also, these factors can be tuned by varying the dimensions and number of the small and large bilayers. We observe an increase in the displacement on increasing the number of bilayers, and robots move consistently in the direction of the bilayers with the larger contact forces.

We have also observed that the robot displacement can be controlled by varying the linker stiffness. Stiff or elongating linkers have lower contact with the underlying surface and consequently anchor less, resulting in greater contact force asymmetry between the bilayer segments and leading to larger displacement.

In terms of speed of locomotion, the time scales of swelling of gel robots are limited by diffusion and are generally slow as compared to, for example, piezoelectric or electromagnetic actuators. But they have advantages, including being powered and operating in aqueous environments without the need for tethers or wires, which is important for locomotion in small and tortuous spaces. We also note that many soft-bodied organisms, such as worms, move slowly. Moreover, many dynamic processes in nature, such as growth, morphogenesis, disease progression, digestion, and decay, are slow processes.

While we heated and cooled the entire setup in our study, the robots have the potential to function autonomously in environments where the temperature oscillates or varies. Also, in the future, it is conceivable that localized heating or cooling modalities could be integrated within the robot body to facilitate programmable or autonomous operation in small aqueous spaces independent of the temperature of the environment. Of note, there are several battery-operated resistive heaters and Peltier elements as well as magnetic, acoustic, or optically excitable particles that could potentially be incorporated within the gels. In terms of the operating temperature range, we note that the LCST in pNIPAM and other gels, such as blends of biocompatible poly(oligo(ethylene glycol) methyl ether methacrylate (pOEGMA)/di(ethylene glycol) methyl ether methacrylate (pDEGMA), are widely tunable across the biological range of temperatures. (13)

Also, in addition to thermally responsive hydrogels, the manipulation of morphology and contact force asymmetry to tune distributed spatiotemporal dynamics of soft robots, as demonstrated in this work, could potentially be utilized with other stimuli responsive materials. For example, hydrogels can swell or deswell in response to multiple stimuli, including light, pH, or DNA hairpins, and locomotion in response to these stimuli can enhance autonomy, programmability, and applicability. (3, 42)

Materials and Methods

Composition of the Hydrogel Inks

We formulated shear-thinning hydrogel inks compatible with the DIW printing process mentioned in FIG. 1A by modifying the rheological properties of aqueous mixtures of monomers, a crosslinker, and a photoinitiator. (10) We used N-isopropylacrylamide (NIPAM) for the active ink and acrylamide (AAM) monomer for the passive ink. The thermoresponsive pNIPAM undergoes a coil-to-globule transition above its LCST, which was measured to be 35.7° C. (FIG. 20), while pAAM shows no thermoresponsivity. We used Laponite nano clay as the rheology modifier, Irgacure 2959 as the photoinitiator, and N, N'-methylenebisacrylamide (BIS) as a crosslinker (used only for the passive AAM ink). We also added two dyes to the mixtures to increase contrast during imaging: a fluorescent rhodamine dye (emission 568 nm) in the active ink and methylene blue in the passive ink.

Preparation of the Hydrogel Inks

NIPAM active ink: We blended Laponite XLG® (BYK USA Inc.) with pure deionized (DI) water, and a 0.12 mg/mL aqueous dye solution of methacryloxyethyl thiocarbamoyl rhodamine B (Polysciences, Inc.). We homogenized the mixture using a planetary mixer (Mazerustar KK-250S, Kurabo Industry Ltd.) for approximately 90 seconds at 2100 rpm. We then added the NIPAM monomer (Scientific Polymer Irgacure-Products Inc.) and the UV photoinitiator 2-Hydroxy-4'-(2-hydroxyethoxy)-2-methylpropiophenone or Irgacure 2959 (BASF). We homogenized the solution again for approximately 150 seconds at 2500 rpm. The relative final concentration of the active ink in (w/w) was: 76% pure DI water; 8.5% NIPAM; 8.5% aqueous rhodamine dye solution; 6.8% Laponite; 0.2% Irgacure.

AAM passive Ink: Like the active ink, we again blended Laponite with pure DI water and a 0.5 mg/mL aqueous dye solution of methylene blue (Sigma Aldrich). We homogenized the mixture for approximately 90 seconds at 2100 rpm. We then added AAM monomer (Sigma-Aldrich), Irgacure 2959, and the crosslinker N, N'-methylenebisacrylamide (BIS, Sigma-Aldrich). We homogenized the solution again for approximately 150 seconds at 2500 rpm. The relative final concentration of the passive ink in (w/w) was: 74.7% DI water; 8.3% aqueous methylene blue dye solution; 7.9% AAM; 6.6% Laponite; 1.7% BIS; 0.8% Irgacure.

Sacrificial Ink: We blended Laponite with pure DI water to make the sacrificial ink to print the supporting layer for the suspended linker of the robot. We homogenized the mixture for approximately 90 seconds at 2100 rpm. The relative final concentration of the sacrificial ink in (w/w) was: 92.6 pure DI water; 7.4% Laponite.

After ink homogenization, we kept the inks at room temperature to age for at least a day prior to use to achieve the desired rheological properties. The ink schematics and additional details are in the Supplementary Materials.

3D Printing and Robot Curing

We first 3D printed the bilayers or robots with the inks and later cured them after printing using UV light. For 3D printing, we generated CAD and STL files using Solidworks (Dassault Systèmes) and used the Slic3r software to generate our G-code files. We used a pneumatic extrusion-based printer (Inkredible+ 3-D Bioprinter, Cellink) to print our bilayers and robots. After calibrating the XYZ axes, we manually estimated the nozzle offset of the two printer heads by printing a calibration structure of two superimposed cylinders also incorporating it into the G-code. Since the robots were printed with three materials (NIPAM, AAM, and sacrificial ink) using a two-nozzle printer, it was necessary to modify the G-code to control the sequence in which the different segments were printed. This sequential printing allowed us to exchange the three inks in the two nozzles during the printing process.

After 3D printing the entire bilayers or robots, we cured them using two UV LED probes (365 nm wavelength, 12 mm lens diameter) and the OmniCure UV (LX 500, Lumen Dynamics) system at 100% exposure intensity for 200 seconds. Since, the robots were wider than the lens diameter, we cured them in sections to achieve a relatively uniform curing. More details on the printer specifications and fabrication setup are included in the Supplementary Materials.

Study Design for Experimental Characterization of the Bilayers and Robots

We designed our study to systematically investigate the effect of tunable engineering parameters such as bilayer thickness ratio, number of bilayers, and linker pattern on bilayer curvature and robot displacement. We carried out thermal cycling experiments using bilayers and robots and conducted all experiments on silicon wafers in water in the same actuation setup. The goal of each time-lapse experiment was to understand and quantify the behavior of the bilayers and the robot over thermal cycling to tune parameters for the model and establish a comparison between experiments and simulations. We have included more details of the thermal actuation of bilayers and robots below and in the Supplementary Materials.

We did robot characterization experiments over multiple (3, 5, and 20) thermal cycles, beginning with the cooling half-cycle and ending with the heating half-cycle. We performed all experiments in triplicate, and we used the data to generate error margins, as shown and mentioned in each figure legend. We used a combination of MATLAB and ImageJ to estimate parameters like the radius of curvature and robot displacement. We generated timelapse videos of the robot actuation using the Windows Movie Maker (Microsoft). We have included additional details regarding imaging and time-lapse experiments in the Supplementary Materials.

Thermal Actuation of Bilayers

After printing the bilayers and curing them, we placed three samples of each bilayer design in a 20 cm×10 cm clear plastic box. We added 750 mL of DI water at room temperature to the box and used a broad-spectrum UV light source to excite the Rhodamine dye in pNIPAM and image the bilayers with a DSLR camera (Canon). After the bilayers equilibrated at 25° C., we thermally cycled the bilayers in water on a hot plate (Thermo Fisher Scientific) by switching the temperature to 60° C. at 1.75° C./min for the heating half-cycle and back to 25° C. at 0.8° C./min for the cooling half-cycle. We took images of the swelling and deswelling of the bilayers over 8 hours in 5-minute intervals.

Thermal Actuation of Robots

We used the same experimental setup and conditions used for the bilayers to characterize the thermal actuation of the gel robots. We generated all the figures in the main text using three or five thermal cycles. For the statistical study of robot displacement shown in FIGS. 9A-11C, we stimulated the robots over ten thermal cycles, turned them around, and stimulated them for ten additional thermal cycles.

Finite Element Analysis

We used finite element analysis to investigate the crawling mechanism of the two-segment robot with a flexible linker. We applied the thermo-chemo-mechanical model of Chester et al. (40) to describe the coupled stress response and swelling behavior of the pNIPAM and pAAM hydrogels. The model was implemented as a user element subroutine (UEL) in ABAQUS. (43) A detailed description of the thermo-chemo-mechanical model and its finite element implementation can be found in the Supplementary Materials.

Briefly, we assumed in the model that the free energy density of the hydrogel can be decomposed additively into a mechanical part for the entropic behavior of the polymer network and a chemical part for the mixing of the solvent and polymer network. We used a compressible Neo-Hookean potential to describe the mechanical part, and the Flory-Huggins potential to describe the chemical part. (44) To model the LCST, we assumed that the Flory-Huggins parameter increased with temperature from a low value for the swollen hydrophilic state to a high value for the deswollen state according to a sigmoidal function. The stress response and chemical potential for the solvent are defined as the partial derivative of the free energy density with respect to the deformation and solvent concentration. We assumed a linear relationship between the solvent flux and the gradient of chemical potential to describe the stress-coupled solvent transport into the hydrogel. The stress response was determined from the mechanical equilibrium equation. The model was implemented into ABAQUS and applied to solve for the swelling and stress response of the hydrogel bilayers and robots.

The model contains ten parameters: the shear modulus, the bulk modulus, the Flory-Huggins interaction parameters at a high and a low temperature, the LCST transition temperatures, the temperature range of the LCST transition, the swelling and deswelling diffusivities, the atomic volume of the solvent, and the reference chemical potential of the solvent. We obtained the values for the shear modulus of the hydrogels from dynamic mechanical characterizations performed in a previous study. (10) We simulated the time-dependent swelling-induced bending of the bilayers with different thicknesses ratios to calibrate the Flory-Huggins interaction parameters at the low and the high temperature, the transition temperature, the temperature range of the transition, and the swelling deswelling diffusivity (Table 2) as described in the Supplementary Materials.

We used the obtained model parameters (Table 4) to simulate the two-segment robot with either a flexible linker or a short stiff linker lying on a frictional rigid surface as described in the Supplementary Materials. The simulations also included the effects gravity and buoyancy on the robot. We applied a temperature profile similar to the experiment as shown in FIG. 15. The simulations calculated the displacements at the centroid of the linker and bilayers and the normal contact force for each specimen.

Supplementary Materials

Details of Hydrogel Inks and Fabrication

Passive and Active Inks for 3D Printing

As mentioned in the methods section, we prepared two monomer inks: an active (NIPAM) and a passive (AAM) hydrogel ink. The active ink was composed of thermo-responsive pNIPAM, which undergoes coil-to-globule transition (deswelling) when the temperature was raised higher than its lower critical solution temperature (LCST), approximately 35.7° C. (FIG. 20). This transition was reversible when the temperature was lowered below the LCST, causing the gel to swell. The passive ink consisted of BIS crosslinked AAM. Notably, while the gels are different, we chose them with careful consideration for good adhesion. Both gels are acrylamides, and it is well known that they copolymerize in the presence of a crosslinker BIS and adhere well. We first printed our bilayers with monomer inks and cured and crosslinked the structure after printing. Our AAM ink consisted of BIS; hence, at the bilayer interface, the two monomers can form a poly(NIPAM-BIS-Aam) copolymer with UV exposure and the photocuring agent 2-Hydroxy-4'-(2-hydroxyethoxy)-2-methylpropiophenone (Irgacure 2959). (46)

We added Laponite nanoclay to both the active and passive inks to make them shear-thinning, which was necessary for extrusion-based 3D printing. These nanoclay platelets arrange into sheet-like structures by weak bond interactions. The shear forces break the weak bonds during extrusion in the 3D printing process and reform once the shear forces are released, showing the characteristic shear thinning behavior. The nanoclay also added mechanical integrity to the gel structures after printing so we could transfer them without any spreading or collapse to our UV curing setup and crosslink them. Besides changing the rheology of the ink, Laponite increases the porosity of the gel, allowing for faster diffusion and equilibration. (45) Irgacure 2959 was added as a photoinitiator for UV cross-linking of the monomer inks. The molecular schematic of the crosslinked inks is in FIG. 6A. Since Laponite does not UV crosslink and dissolves in water, we prepared a sacrificial ink composed of just Laponite and water. The NIPAM ink extrudes at a pressure between 90-120 kPa, AAM at 130-150 kPa, and the sacrificial ink at 90-120 kPa. As the ink ages, this extrusion pressure increases slowly, and we would need higher pressure values for older inks. (45)

3D Printing of Hydrogel Robots and Laponite

Our printing process consisted of three steps described below and in FIG. 6B.

Calibration of the 3D Printer

We filled the three inks into the UV-shielded cartridges (3 mL, Cellink) and centrifuged them at 2400 rpm for 120 seconds to remove any air bubbles. We attached the cartridges to high-precision nozzles (0.4 mm inner diameter, 22 G) and loaded them into the pneumatic 3D printer (Inkredible+3D Bioprinter, Cellink). We printed a calibration structure consisting of two superimposed cylinders and determined the nozzle offset that we incorporated into the G-code. Finally, we covered the glass slides with PTFE sheets (for easy removal of structures after curing) and fixed them on the printing platform.

G-Code Preparation and Printing

We generated the CAD and STL files for all robots using Solidworks (Dassault Systèmes). We used the Slic3r software to generate our G-code files after incorporating any nozzle offsets (Layer height-0.4 mm; printing speed 10 mm/s; Infill Type-Rectilinear; Infill angle—0°; Perimeters—1). We utilized a two-nozzle printer and switched the Laponite ink out of the printer head during the fabrication to allow printing with the third ink. We modified our G-code to control the order in which we printed the different segments to give us enough time to conduct the ink switch. We conducted the printing process in the open air at 25° C.

Details of the Curing and Actuation Process

After 3D printing the robot, we used the OmniCure UV (LX 500, Lumen Dynamics) curing setup to crosslink the monomer inks. Uniform curing of the robot was essential to achieve the desired and reproducible shape change. We exposed the structures at 100% intensity for 200 seconds to two UV light-emitting diode (LED) heads (365 nm wavelength, 12 mm lens diameter) with a resultant UV intensity of 0.4 $W/cm^2$. We fixed the probes perpendicular to the structures at the height of 3 cm. At this distance, the LED heads could only cure an area of approximately 15 mm in diameter at a time. Since our robots were 45-55 mm long, we cured them segment by segment. After curing, we immersed the robots in a transparent plastic box filled with deionized (DI) water. We placed the box on a hot plate for the actuation test. We conducted thermal stimulation of the robots by cycling the temperature between 25° C. for the cooling half-cycle and 60° C. for the heating half-cycle. We estimated the cooling rate to be 0.8° C./min and the heating rate to be 1.75° C./min.

Differential Scanning Calorimetry

We used differential scanning calorimetry (DSC) (DSC 25, TA Instruments) to determine the LCST of the pNIPAM-Laponite hydrogel ink. We printed and cured three samples of NIPAM gel and allowed them to swell overnight. After removing excess water, we loaded the sample in a crucible and equilibrated the gel at 25° C. for 5 minutes. Next, we heated the hydrogel to 45° C. at the rate of 2° C./min in a nitrogen atmosphere. We observed an endothermic peak corresponding to the lower critical solution temperature (LCST) at 35.7° C., as shown in FIG. 20.

Imaging and Data Analysis

Macro Imaging

We imaged all our structures using a digital single-lens reflex camera (DSLR, Canon EOS 6D Mark II), EF 24-70 mm f/4L IS USM, and EF 100 mm f/2.8 L Macro IS USM lenses. We imaged the cured and dry state of our robots in air. We took transient state images of our bilayers and robots at an interval of five minutes as we thermally cycled them in the water. We used a wireless shutter release controller for imaging while exposing the robots to a broad-spectrum UV light to excite the fluorescent dye. We then immersed the hydrogels in a fixed amount of DI water in a plastic box which we placed on a hot plate.

Image Processing and Actuation Video Generation

We used a combination of MATLAB and ImageJ (NIH) software to analyze our experimental data. First, we measured the radius of curvature (ROC) of the bilayers at each time point from experimental snapshots using a MATLAB code. Our code mapped the curvature of the bilayer using three points—the left end, the middle, and the right end. Then, using the coordinates of those three points, we performed curve fitting to a second-degree polynomial equation and calculated the ROC at the middle point using the differential equation (1). (47) We also used the same code to process the bilayer curvature during the swelling study of the robot.

$$R = \left| \frac{\left(1 + \left(\frac{dx}{dy}\right)^2\right)^{\frac{3}{2}}}{\frac{d^2y}{dx^2}} \right| \quad (1)$$

For our actuation studies of the robots, we measured the displacement of the robot using ImageJ. We used a combination of Lightroom and Photoshop (Adobe) to enhance the fluorescence in our images for better contrast. We processed the time-lapse videos on ImageJ and created the video clips using Windows movie maker (Microsoft).

Details of the Bilayer and Robot Characterization Experiments

Bilayer Characterization Experiments

We printed 10 mm×15 mm bilayers (lateral dimensions), varying pAAM layer thickness between 0.4 mm and 0.8 mm, while pNIPAM between 0.4 mm, 0.8 mm, 1.2 mm, and 1.6 mm, to perform the transient state actuation study of the bilayers. We added 750 mL of DI water at 25° C. and used a broad-spectrum UV light source to excite the fluorescent dye in the structures. We set up a wireless shutter release timer to control our DSLR camera at intervals of five minutes. After the bilayers swelled from the cured state at 25° C. and were at equilibrium, we heated them to 60° C. at 1.75° C./min. We performed all experiments in triplicate to generate error bars to account for batch-to-batch differences. We observed both the bilayers with 0.4 mm pAAM (Bl1,2) actuate twice as fast as the three 0.8 mm pAAM bilayers (Bl3-5), the thinnest bilayer (Bl1) achieving the highest curvature. The thicker bilayers have smaller curvatures because the thicker pAAM increases the bending stiffness of the bilayer. The higher bending stiffness, combined with the low aspect ratio of the bilayers, made them more resistant to swelling-induced bending. Our experiments demonstrated that we could control both temporal and morphological responses of the bilayer to thermal cycling by varying the stiffness and thickness ratio of the bilayer (FIG. 7B).

Robot Characterization Experiments

Characterization of the Kinetics of Robot Swelling

We measured the transient response of the two-segment robot with a flexible linker during the cooling half-cycle. First, we fabricated and cured our robot with a flexible linker, immersed it in DI water, and imaged both the top and side views of the robot as it swelled and equilibrated. From the top view images, we observe that the cooling half-cycle does not influence the displacement of the robot. Using the side view snapshots, we plotted the curvature, K, of the two bilayer segments, the linker, and the robot, against the normalized time. We observed that the curvatures of the two bilayers and the linker influence each other through the cooling half-cycle, which created a morphological asymmetry in the structure of the robot and eventually allowed the robot to move ahead in the heating half-cycle. (FIG. 8B).

Robot Actuation-Statistical Study

We conducted a statistical study on the robots for 20 thermal cycles to ensure consistent unidirectional motion. Using the same setup as the actuation experiment, we put all the robots through ten forward cycles. Later, we turned the robots around and thermally stimulated them for ten more cycles. We normalized all the displacement data against the cured state length of the robot and plotted the percentage displacement of the robot from the origin against the actuation cycle (FIGS. 9A-9D, 10A-10D). We observed that all our robots actuate consistently in one direction, moving either in the direction of their large or small bilayer. At the end of 20 thermal cycles, we observed that all the robots went slightly behind the starting position. This variation in displacement is due to the hysteresis in the reordering of the pNIPAM chains during thermal stimulation, which causes a slight difference in robot displacement every thermal cycle. We conducted the actuation experiments using three samples to generate a sufficient error margin.

Three-Segment Robot with a Flexible Linker

We explored strategies to increase the displacement of our robot by modifying the number of segments. We hypothesized that we could create more asymmetry by having an uneven number of segments on either side of our robot. We varied the shape of the linker by making it wider to allow for two bilayer segments on one side. The robot had two small bilayers on one side and a larger bilayer on the opposite side. We centered and connected them using a flexible pNIPAM linker. After curing and sacrificial structure dissolution, we conducted thermal cycling of our robot in water by switching the temperature to 25° C. for the cooling half-cycle to 60° C. for the heating half-cycle. During the cooling half-cycle of the robot, it was allowed to swell at 25° C. We observed that all three bilayers curled up due to the swelling mismatch, and the smaller bilayers moved minutely ahead while the larger bilayer stayed anchored. When heated beyond the LCST, the robot deswelled rapidly, with the smaller bilayers curling up and the large bilayer minutely moving ahead. Further heating resulted in pNIPAM deswelling beyond its cured state length and caused the bilayers to bend with a curvature in the opposite direction compared to swelling (FIG. 11A-11C).

The three-segment robot with a flexible linker moved unidirectionally for three actuation cycles in the direction of the larger bilayer. This 3.9% body length/cycle motion was lesser than all our other robots. We compared this to our two-segment robot with a flexible linker. This robot also had a sagging linker but displaced farther than its three-segment counterpart. We attributed the lower displacement in the three-segment robot to the larger area of the linker touching the bottom surface. The sagging linker drastically reduced the asymmetry in the contact forces despite the extra bilayer segment, ultimately decreasing the speed of the robot. We further conducted a 20-cycle statistical study on the three-segment robot with a flexible linker (FIG. 11C). We observed consistent unidirectional movement across 20 cycles.

Coupled Thermo-Chemo-Mechanical Theory for Hydrogels

We applied the coupled thermo-chemo-mechanical theory of Chester et al. (40) to describe the time-dependent mechanical and swelling behavior of the pNIPAM and pAAM hydrogels used in this study. In the following sections, we will briefly review the coupled diffusion-deformation theory and finite element implementation developed by Chester et al. (43). Abaqus UEL code used in finite element analysis is available for download as a supplemental material of the Chester et al. (43)

Kinematics of Deformation

Consider a hydrogel body in its dry reference state. A smooth, one-to-one mapping, $x=\phi(X)$, describes the relationship between the undeformed, dry reference state of hydrogel, X, to a deformed, hydrated state of hydrogel, x. The deformation gradient is given by, $$F = \frac{\partial x}{\partial X}. \tag{1}$$

and deformation gradient tensor, F, can be multiplicatively decomposed into elastic deformation, $F^e$, and swelling deformation, $F^s$, $$F = F^e F^s. \tag{2}$$

Deformation corresponding to thermal expansion is significantly small compared to mechanical and swelling deformation. Therefore, we ignored the thermal deformation gradient in the total deformation gradient decomposition.

We further assume the hydrogel undergoes isotropic swelling with $F^s=\lambda_s 1$ where $\lambda_s$ is the swelling stretch. Volume change associated with large deformation of hydrogel is given by, $$J = \det F = \det(F^e F^s) = \det(F^e)\det(F^s) = J^e J^s. \tag{3}$$

The change in the reference volume of hydrogel is entirely attributed to the solvent absorption or desorption within the hydrogel which we can write as:

$$\phi = (\lambda_s)^{-3} = (1 + \Omega c_R)^{-1}. \tag{4}$$

Here, $\phi$ is the polymer volume fraction, $\Omega$ is the atomic volume of solvent, and $c_R$ is the concentration of solvent in the reference configuration. We further define the polymer volume fraction as, $\phi=1/J^s$, and the following relation can be obtained:

$$J^s = 1 + \Omega c_R \quad \Rightarrow \lambda_s = (1 + \Omega c_R)^{\frac{1}{3}}. \tag{5}$$

Governing with Equations Initial and Boundary Conditions

The balance of linear momentum in the deformed hydrogel body is given by, $$\nabla_x \cdot \sigma + b = 0, \tag{6}$$

where $\sigma$ is the symmetric Cauchy stress and b is the body force. The boundary conditions for (6) can be prescribed either as displacements or tractions as follows:

$$u = g \text{ on } \Gamma_g, \qquad \sigma \cdot n = h \text{ on } \Gamma_h, \tag{7}$$

where g is the applied displacement on the surface $\Gamma_g$ and h is the traction applied on the surface $\Gamma_h$ with a unit outward normal n.

The balance of mass of the solute in the deformed hydrogel body is given by, $$\dot{c}_R = -J\nabla_x . j, \tag{8}$$

where j is the flux of the solute and $\dot{c}_R$ is the rate of concentration in the reference configuration of the hydrogel.

Applying (4), (8) can be rewritten as, $$\frac{\dot{\phi}}{J\Omega\phi^2} - \nabla_x \cdot j = 0 \tag{9}$$

The boundary conditions for (9) can be specified either in terms of chemical potential or flux for all time as follows:

$$\mu = \mu_n \text{ on } \Gamma_\mu, \qquad -j \cdot n = j_n \text{ on } \Gamma_j, \tag{10}$$

here, $\mu_n$ is the applied chemical potential on the surface $\Gamma_\mu$ and $j_n$ is the applied flux on the surface $\Gamma_j$.

We specified an initial condition for chemical potential at time t=0 in the following form:

$$\mu(X, 0) = \mu_0. \tag{11}$$

Constitutive Relations

The constitutive behavior of hydrogel can be attributed to the mixing of non-crosslinked polymer and solvent and the elastic stretching of crosslinked polymer. In what follows, the free energy density of hydrogel can be additively decom posed to polymer mixing and elastic stretching. (40,43,48, 49)

$$\psi = \psi_{mixing} + \psi_{elastic}. \tag{12}$$

The free energy density of polymer mixing is taken to be (40,43), $$\psi_{mixing}(c_R, T) = \mu^0 c_R + RTc_R\left[\ln\left(\frac{\Omega c_R}{1+\Omega c_R}\right) + \chi(T)\left(\frac{1}{1+\Omega c_R}\right)\right]. \tag{13}$$

Here, $\chi(T)$ is a dimensionless parameter associated with the enthalpy of polymer mixing and known as the Flory-Huggins interaction parameter. Smaller $\chi$ indicates a larger degree of swelling and larger $\chi$ indicates a smaller degree of swelling or deswelling. For thermoresponsive LCST hydrogels, the Flory-Huggins interaction parameter can be described with a sigmoidal function as follows (40), $$\chi(T) = \frac{1}{2}(\chi_H + \chi_L) + \frac{1}{2}(\chi_H - \chi_L)\tanh\left(\frac{T - T_{trans}}{\Delta}\right), \tag{14}$$

where $T_{trans}$ is the transition temperature and A is the temperature range of the LCST transition. The $\chi_H$ and $\chi_L$ are the Flory-Huggins interaction parameters of the deswollen and swollen hydrogel, respectively.

A compressible Neo-Hookean potential is used for the elastic part of the free energy density, (40,43,49)

$$\psi_{elastic}(C) = \frac{G}{2}\left[3(\bar{\lambda}^2 - 1) - 2\ln J\right] + \frac{J^s}{2}\left[\kappa(\ln J^e)^2\right], \tag{15}$$

where G is the shear modulus, and K is the bulk modulus of the dry hydrogel. We set κ=100 G for all simulations to approximate the nearly incompressible behavior of pNIPAM and pAAM hydrogels, the effective stretch $\bar{\lambda}$ is defined as follows:

$$\bar{\lambda} = \sqrt{\frac{1}{3}tr(C)}, \tag{16}$$

where $C=F^TF$ is the right Cauchy-Green deformation tensor. The total free energy of the thermoresponsive hydrogel can be written as, $$\psi = \mu^0 c_R + RTc_R\left[\ln\left(\frac{\Omega c_R}{1+\Omega c_R}\right) + \chi\left(\frac{1}{1+\Omega c_R}\right)\right] + \frac{G}{2}\left[3(\bar{\lambda}^2 - 1) - 2\ln J\right] + \frac{J^s}{2}\left[\kappa(\ln J^e)^2\right]. \tag{17}$$

The 2nd Piola-Kirchhoff (PK2) is defined as $$S = 2\frac{\partial\psi}{\partial C}.$$

The Cauchy stress tensor, $$\sigma = \frac{1}{J}FSF^T$$

can be obtained by performing a push-forward operation on the PK2 stress:

$$\sigma = \frac{1}{J}\left[2F^e\frac{\partial\psi}{\partial C^e}F^{eT}\right] = \frac{1}{J}\left[G(B-1) + J^s\kappa(\ln J^e)\right], \tag{18}$$

where $B=FF^T$ is the left Cauchy-Green deformation tensor and $C^e=F^{eT}F$ is the elastic right Cauchy-Green deformation tensor.

The chemical potential is defined from the free energy density as $$\mu = \frac{\partial\psi}{\partial c_R},$$

which gives, $$\mu = \frac{\partial\psi}{\partial c_R} = \mu^0 + RT\left[\ln(1-\phi) + \phi + \chi\phi^2\right] - \Omega\kappa(\ln J^e) + \frac{\kappa\Omega}{2}\left[\ln(J^e)\right]^2. \tag{19}$$

We assumed Darcy-type fluid flow within the hydrogel where fluid flux depends linearly on mobility tensor, M, and gradient of the chemical potential, μ:

$$j = -M\nabla_x\mu, \tag{20}$$

where temperature-dependent isotropic mobility tensor, M, is defined as, $$M = \frac{Dc_R}{JRT}1. \tag{21}$$

Here, D represents the diffusion coefficient of the solvent within the polymer mixture.

Determining the Swelling Stretch of the Cured State

The constitutive model and its finite element implementation developed by Chester et al. (43) assume the hydrogels are initially at a dry state. In practice, we fabricated the hydrogel bilayers by direct ink writing of monomers dispersed in water followed by UV-crosslinking. The monomer inks and, consequently, the crosslinked hydrogel bilayers contain solvent (water). We assumed that the temperature-dependent total swelling stretch could be decomposed multiplicatively as follows, $\lambda_s(T)=\lambda_t(T)\lambda_c$. The $\lambda_c$ is the swelling stretch from the dry state to the deswollen hydrated state of the 3D printed hydrogel after curing, which involved UV crosslinking at room temperature, but before being immersed in water. We refer to this deswollen hydrated state as the cured state. The $\lambda_t$ is the relative swelling stretch of the hydrogel defined from the cured state to the current state for the hydrogel immersed in water. To calculate $\lambda_c$, we 3D printed three pNIPAM hydrogel blocks and measured their dimensions after curing. We next dried the blocks at room temperature for 24 hours and measured the dimensions of the dried samples. We calculated the swelling stretch of the cured state as the ratio of the length of the blocks before drying and after drying, which yielded/c=1.2±0.02.

Determining the Flory-Huggins Parameters and the Swelling and Deswelling Diffusivities In a previous work (50), the Flory-Huggins interaction parameters, $\chi_L$, $\chi_H$, $T_{trans}$, and $\Delta$ in equation (14) were fit to the equilibrium swelling stretch $\lambda_t(T)$ measured at different temperatures for a hydrogel block using equations (22) and (23). For an unconstrained, homogeneous hydrogel in equilibrium, the stress under plane-strain conditions ($\lambda_1=\lambda_2=\lambda_s$ and $\lambda_3=1$) is, $$\sigma_1=\sigma_2=\frac{1}{\lambda_s^2}\left[G(\lambda_s^2-1)1+\frac{\kappa}{\phi}\ln(\lambda_s^2\phi)1\right]=0. \tag{22}$$

The chemical potential can be written as, $$\mu=\mu^0+RT\left[\ln(1-\phi)+\phi+\chi\phi^2\right]-\Omega\kappa\ln(\lambda_s^2\phi)+\frac{\kappa\Omega}{2}\left[\ln(\lambda_s^2\phi)\right]^2=0. \tag{23}$$

In this work, we found that a 3D printed pNIPAM hydrogel block exhibited greater swelling than the pNIPAM layer of a 3D printed bilayer because the ink was a composite material. The composition of pNIPAM in the ink was 8.5% by weight. Thus, we obtained the Flory-Huggins parameters and the swelling and deswelling diffusivities phenomenologically by fitting the FEA simulation of the bending of pNIPAM-pAAM bilayers immersed in water at 25° C. and 60° C. to experiments. Since the swelling-induced bending of the hydrogel bilayers is a highly nonlinear physical phenomenon and there exists variability among hydrogel samples, we did not apply an optimization algorithm for parameter calibration. Therefore, the parameters we obtained were not the optimum set of parameters for the hydrogels but were sufficiently reasonable to describe the physics of locomotion. The details of the FEA simulations are described herein.

To obtain an initial guess for $\chi(T)$ and the effective temperature of the cured state for the FEA simulations, we first assumed a sigmoidal temperature dependence for the swelling stretch at equilibrium and guessed $\lambda_t$ at four different temperatures 25° C., 35° C., 45° C., and 60° C. based on the equilibrium swelling measurements from a prior study. (10,29) We then calculated the total swelling stretch, $\lambda_s$, at the four temperatures using the cured state stretch, $\lambda_c=1.2$, and then assumed $\lambda_t$. The Flory-Huggins interaction parameter $\chi$ for each $\lambda_s$ was determined by solving equations (22) and (23) numerically using Newton-Raphson. We next fit the sigmoidal equation (14) to the four values of $\chi$ to determine $\chi_L$, $\chi_H$, $T_{trans}$, and $\Delta$. To obtain the effective cure temperature, we calculated the $\chi_{cure}$ for the cured state, defined as $\lambda_s=\Delta_c=1.2$. The cure temperature, $T_{cure}$, was determined by setting $\chi(T_{cure})=\chi_{cure}$.

These parameters for $\chi(T)$ and $T_{cure}$ were used for the FEA simulations of transient swelling of the bilayer described in Section 5. The FEA simulations of the bilayers were used to fit iteratively the swelling deswelling diffusivities $D^S$ and $D^D$, respectively, as well as $\chi_L$, $\chi_H$, $T_{trans}$, and A using the values from the equilibrium calculations described above as the initial guess. We assumed the following initial guesses for the swelling and deswelling diffusivities, $D^S=D^D=D_0=5\times10^{-9}$ m²/s, where $D_o$ is the self-diffusivity of water at 60° C. (37) We simulated five pNIPAM-pAAM bilayers of different thickness ratios and compared equilibrium bending curvatures to the experimentally measured equilibrium bending curvatures at 25° C. and 60° C. We used this to determine the Flory-Huggins parameters, $\chi_L$ and $\chi_H$ (FIG. 7B). We calculated the bending curvature of the bilayers at the center of the bottom surface of the pAAM substrate by numerically differentiating the deformed x- and y-positions of the bilayer following equation (1). The resulting values $\chi_L$ and $\chi_H$ are listed in Table 2. Note that the $\chi_L$ and $\chi_H$ and swelling and deswelling stretches were the same for four of the thicker bilayer geometries. The free swelling and deswelling strain from the cured state for the resulting $\chi_L$ and $\chi_H$ are listed in Table 3. We note that $\chi_L$ is larger than 0.5 which is the typical value for hydrogels. The typical values of Flory-Huggins parameters are based on idealized polymer-solvent conditions. In contrast, our hydrogel was a complex composite that was composed of pNIPAM (polymer), Laponite (clay), and Irgacure (salt). In our model, the Flory parameter, x, and the shear modulus directly determined the swelling strain which was small (12%) for our system (8.5% pNIPAM by weight).

Once $\chi_L$ and $\chi_H$ were determined, we next fit the remaining parameters, $T_{trans}$ and A of equation (14), and the swelling and deswelling diffusivities, $D^S$ and $D^D$, to the transient swelling-induced bending curvature during cooling to 25° C. and heating to 60° C. (FIG. 7B). The resulting $T_{trans}$ and A were the same for all the bilayer geometries (Table 2). Note that the resulting deswelling diffusivity was five to ten-fold higher than the swelling diffusivity.

Finite Element Analysis

Chester et al. (43) implemented the constitutive model described in the Section 4 in ABAQUS as a user-defined element (UEL) subroutine. Details of the finite element implementation and verification of the UEL subroutine can be found in (43). We discuss the finite element model of the pNIPAM-pAAM bilayers, applied temperature history, the initial and boundary conditions, and the calibration of the Flory-Huggins interaction parameters and the swelling and deswelling diffusivities. We discuss the finite element model of the two-segment robot with a flexible linker with applied temperature history and the initial and boundary conditions.

Finite Element Model of the pNIPAM-pAAM Bilayer

We performed finite element simulations of the swelling-induced bending of the pNIPAM-pAAM bilayers to calibrate the Flory-Huggins interaction parameters and the diffusivities. We scaled all the dimensions of the finite element model by the inverse of the cured state stretch, $1/\lambda_c$, to begin the simulation from a dry state. For efficient computation, we leveraged the symmetry of bilayer geometry and boundary conditions about the y-axis and performed simulation on the half-symmetric model of the bilayer structures. We show the schematic of the 2D finite element model of the B12 bilayer in its dry state in FIG. 12. We discretized the finite element models of the bilayers using user-defined plane strain, the bilinear quadrilateral element with displacements and chemical potential as the degrees of freedom, and four Gaussian integration points, abbreviated as UPE4 type elements in Chester et al. (43) We used elements with a dimension of 0.0816×0.0208 mm for bilayer B11-4, and for B15, we used elements with a dimension of 0.1633×0.0416 mm. We show the finite element meshing and boundary conditions applied to B12 in its dry state in FIG. 12.

Temperature Profile Applied to Bilayer Simulations

We started the finite element simulations at the dry state of the hydrogel, as mentioned earlier, so we applied a temperature, $T_{cure}$ for a time of ten days to obtain the dimensions of the bilayers at the cured state. While the change in bending curvature of the bilayers became negligible within a few hours, we chose a longer time in the simulation to obtain a uniform chemical potential field throughout the mesh within machine precision.

We applied a temperature history to the bilayers following the curing step, as shown in FIG. 13. We cooled the bilayers from $T_{cure}$ to 25° C. at a 1.67° C./min rate followed by a hold at 25° C. The total time of the cooling half-cycle for the bilayers was eight hours. We then heated the bilayers to 60° C. at a rate of 1.75° C./min and kept them at 60° C. The total time for heating half-cycle was two hours. In practice, pAAM is not a thermoresponsive hydrogel. Still, in the finite element simulations, we considered pAAM to be thermoresponsive during the curing step to obtain the dimensions measured in the cured state. For pAAM hydrogel, we specified $\chi(T_{cure})=\chi_{cure}$ so that pAAM did not respond to any thermal stimuli applied subsequently.

Initial Conditions of Bilayers

We calculated the initial condition, $\mu_0$, for the bilayer structures using (19) using the model parameters listed in Table 1 and the conditions $\mu^0=0$, $J^e=1.0$, $\phi=0.99$, $T=T_{cure}>\chi=\chi_{cure}$. Since the model uses the dry state of the polymer as the reference state, we used $\phi=0.99$ to represent that reference state and avoid numerical issues.

Boundary Conditions of Bilayers

During the curing step, we prescribed $u_x=0$ and $\sigma_{xy}=0$ along the symmetry plane AD, $u_y=0$ along AB to avoid swelling-induced bending, and $u_x=u_y=0$ at A to avoid any rigid body motion, as shown in FIG. 12. The surfaces BC and CD were taken to be traction-free. The displacement constraint was released from surface AB at the end of the curing step because both pAAM and pNIPAM layers had the same swelling ratio. We set the surface AB to be traction free during the cooling and heating half-cycle steps. We also prescribed a time-dependent chemical potential $$\mu(t)=\mu^0+\mu_0\exp\left(\frac{-t}{t_d}\right)$$

on BC and CD, where $t_d<<t$, to gradually achieve $\mu=\mu^0$ and avoid numerical issues. For pNIPAM-pAAM bilayers, we chose $t_d=10000$ s.

Material Parameters for the Bilayer Simulations

The shear moduli of pNIPAM and pAAM hydrogels were measured (29), and the atomic volume of the solvent was calculated and listed in Table 1.

TABLE 1

The experimentally measured material properties used for finite element simulations of pNIPAM-pAAM bilayers

| Material parameters | Value |
|---|---|
| Shear modulus of pNIPAM, $G_{pNIPAM}$ | 2.32 kPa |
| Shear moduli ratio of the gels, $\frac{G_{pAAM}}{G_{pNIPAM}}$ | 15.36 |
| Atomic volume of solvent water, $\Omega$ | $1.8\times10^{-5}$ m$^3$/mol |
| Cured state swelling strain, $\varepsilon^s_{cure}$ | 20% |

The Flory-Huggins interaction parameters, $\chi_L$, $\chi_H$, $T_{trans}$, and A, and the swelling and deswelling diffusivities, $D^S$ and $D^D$, were determined by fitting the swelling-induced bending simulation of five pNIPAM-pAAM bilayers to experiments (FIG. 7B) as described herein. The parameters obtained from the fit are listed in Table 2 for the five different bilayer thickness ratios.

TABLE 2

The material parameters obtained from fitting to the bilayer swelling experiments

| | Thickness of pNIPAM-pAAM layers | | | | |
|---|---|---|---|---|---|
| Properties | 0.4 mm-0.4 mm | 0.8 mm-0.4 mm | 0.8 mm-0.8 mm | 1.2 mm-0.8 mm | 1.6 mm-0.8 mm |
| Flory-Huggins parameter at 25° C., $X_L$ | 0.77672 | 0.80312 | 0.80312 | 0.80312 | 0.80312 |
| Flory-Huggins parameter at 60° C., $X_H$ | 1.0483 | 1.0483 | 1.0483 | 1.0483 | 1.0483 |
| Transition temperature, $T_{trans}$ (K) | 318.0 | 318.0 | 318.0 | 318.0 | 318.0 |
| Range of transition temperature, $\Delta$ (K) | 8.0 | 8.0 | 8.0 | 8.0 | 8.0 |
| Swelling diffusivity, $D^S$ (m$^2$/s) | $1\times10^{-10}$ | $8\times10^{-11}$ | $2\times10^{-10}$ | $2\times10^{-10}$ | $2\times10^{-10}$ |
| Deswelling diffusivity, $D^D$ (m$^2$/s) | $1\times10^{-9}$ | $2\times10^{-10}$ | $5\times10^{-10}$ | $5\times10^{-10}$ | $5\times10^{-10}$ |
| Curing temperature, $T_{cure}$ | 323 K | 323 K | 323 K | 323 K | 323 K |

Flory-Huggins interaction parameters, $\chi_L$ and $\chi_H$, determine the swelling and deswelling strains at the low and high temperatures of the LCST. Table 3 lists the swelling and deswelling strains, from the cured state, corresponding to the Flory-Huggins interaction parameters listed in Table 2.

TABLE 3

Swelling and deswelling strain of the pNIPAM hydrogels from the cured state

| Strain | Thickness of pNIPAM-pAAM layers<br>0.4 mm-0.4 mm | 0.8 mm-0.4 mm | 0.8 mm-0.8 mm | 1.2 mm-0.8 mm | 1.6 mm-0.8 mm |
|---|---|---|---|---|---|
| Swelling strain at 25° C. | 15% | 12% | 12% | 12% | 12% |
| Deswelling strain at 60° C. | 3% | 3% | 3% | 3% | 3% |

Finite Element Model of the Two-Segment Robot with a Flexible Linker

The simulations of the two-segment robots with a flexible linker were similar to those of the stand-alone bilayers. We started the simulations in the cured state and scaled the finite element geometry for the two-segment robots by $1/\lambda_c$. We used plane-strain bilinear quadratic elements with displacements and chemical potential as the degrees of freedom and four Gaussian integration points. The total number of elements was 21089 and 20264 for the two-segment robots with a flexible linker and a short stiff linker, respectively. We show the details of the meshing for the two-segment robot with the flexible linker in FIG. 14. Dimensions of the smallest and the largest element within the bilayers in the x-direction were 0.02083 and 0.1633 mm, respectively, with a meshing bias towards the linker, while we used the same element sizes in the linker but with a bias toward the bilayers. Dimensions of the smallest and the largest element along the y-direction were 0.02082 mm and 0.0416 mm, respectively, with a bias toward the top surface of the pNIPAM segment of the bilayers.

List of Material Properties Used in the Simulation of the Two-Segment Robot with a Flexible Linker While simulating the locomotion of the two-segment robot, the material parameters were either obtained from literature or calibrated to the swelling-induced bending experiments of the bilayers described herein. Since four of the five bilayer geometries had the same swelling and deswelling strains, we chose the Flory-Huggins interaction parameters corresponding to those bilayers. We used the diffusivity values obtained from the 0.4 mm pNIPAM-0.4 mm pAAM (Bl1) bilayer sample to ensure swelling and deswelling kinetics were significantly different and could produce locomotion. The shear moduli of the hydrogels were measured in a previous study (10,28), and the density of the hydrogels was obtained from the literature. (51) We present a complete list of the material properties used in simulating the two-segment robots in Table 4.

TABLE 4

The material parameters used in the simulation of the two-segment robot

| Material parameters | Value |
|---|---|
| Density of pNIPAM and pAAM, $\rho_{Gel}$ | 1100 g/m3 |
| Shear modulus of pNIPAM, $G_{pNIPAM}$ | 2.32 kPa |
| Shear moduli ratio of the gels, $\frac{G_{pAAM}}{G_{pNIPAM}}$ | 15.36 |

TABLE 4-continued

The material parameters used in the simulation of the two-segment robot

| Material parameters | Value |
|---|---|
| Cured state swelling strain, $\varepsilon^s_{cure}$ | 20% |
| Curing temperature, $T_{cure}$ | 323 K |
| Flory-Huggins parameter at 25° C., $\chi_L$ | 0.8031 |
| Flory-Huggins parameter at 60° C., $\chi_H$ | 1.0483 |
| Transition temperature, $T_{trans}$ (K) | 318 K |
| Range of transition temperature, $\Delta$ (K) | 8.0 |
| Swelling diffusivity of pNIPAM, $D^S$ | $1 \times 10^{-11}$ m$^2$/s |
| Deswelling diffusivity of pNIPAM, $D^D$ | $1 \times 10^{-10}$ m$^2$/s |
| Atomic volume of solvent water, $\Omega$ | $1.8 \times 10^{-5}$ m$^3$/mol |

Temperature Profile Applied to the Two-Segment Robot with a Flexible Linker Simulations Subsequently, as illustrated in FIG. 15, we cooled the robot to 25° C. at a rate of 1.67° C./min and held it at this temperature for 2.45 hours, followed by heating it to 60° C. at 0.58° C./min and keeping it at that temperature for 2 hours. The time period for cooling and heating half-cycles spanned over three hours each, totaling a six-hour temperature application to the robot for an actuation cycle.

Initial Conditions of the Two-Segment Robot with a Flexible Linker

We calculated the initial condition for the chemical potential, $\mu_0$, for the robot using (19) while assuming $\mu^0=0$, $J^e=1.0$, $\phi=0.99$, $T=T_{cure}$, $\chi=\chi_{cure}$. To avoid numerical issues and to represent the dry state of the polymer as the reference state, we used $\phi=0.99$.

Body Force on the Two-Segment Robot with a Flexible Linker

A body force, $b_y=-\Delta\rho g$, was applied along the y-direction on the robot during iso-thermal curing, cooling half-cycle, and heating half-cycle where $\Delta\rho=100$ kg/m3 is the difference in the density between the polymer and water and g is the gravitational acceleration.

Boundary Conditions of the Two-Segment Robot with a Flexible Linker

Like the bilayers, $$\mu(t) = \mu^0 + \mu^0 \exp\left(\frac{-t}{t_d}\right)$$

was applied on the top and side surfaces of pNIPAM hydrogel during iso-thermal curing and later propagated in cooling and heating half-cycles. For the small and large bilayers, we chose $t_d$=5000 s, while for the linker, we chose $t_d$=20000 s. Since the pNIPAM linker was thinner than the bilayers, we chose a larger ta for the linker to avoid rapid diffusion and deformation compared to the bilayers during the curing step. A schematic of the two-segment robot with prescribed boundary conditions is shown in FIG. 16.

We prescribed $u_x$=0 at the center of the linker and $u_y$=0 at the pAAM boundaries in contact with the surface during iso-thermal curing. In cooling and heating half-cycles, we released all the kinematic constraints and connected a compliant spring with a stiffness of k=0.1 N/m between the center of the linker and an arbitrary node on the contact surface. The spring prevented the rigid body motion of the robot during cooling and heating half-cycles. We also performed a baseline simulation of the two-segment robot without the compliant spring and obtained the same net displacement of the robot (FIG. 17). However, except for the baseline case, the simulations did not converge in general without the flexible spring constraint at the center of the linker. Therefore, we used the spring for all other simulations mentioned in this article.

Effect of the Contact Conditions on the Locomotion of the Two-Segment Robot with a Flexible Linker We assumed node-to-node contact between a rigid surface and the bottom surfaces of the two bilayers and the linker. We assumed a contact condition from the beginning of the simulation. We adopted a Coulomb friction law with a friction coefficient of, $f_k$=0.1 between the contact elements of the two surfaces. (51) We simulated the baseline case with a frictionless contact surface, where, $f_k$=0.0, to determine the effect of friction on the motion of the robot. We plotted the displacement of the center of the linker for the baseline robot on a surface with a friction coefficient of, $f_k$=0.1 and a frictionless surface with a friction coefficient of, $f_k$=0.0, over the normalized actuation time in FIG. 18. Unlike the baseline case on a surface with, $f_k$=0.1, we observed that the center of the linker did not show any displacement on the frictionless surface. In the absence of the Coulomb friction, there was no difference in friction force among the bilayer segments and linker. Therefore, neither of the bilayers acted as anchors during the heating half-cycle. To further understand if the difference in friction forces between the bilayer segments was responsible for the crawling mechanism, we interchanged the position of the bilayers in our finite element simulation. We performed the simulation with the same material parameters, initial and boundary conditions, and temperature history described herein. This robot was discretized similarly to the baseline case described. The robot translated towards the direction of the larger bilayer in this case as well, which is in-x direction (FIG. 19A) compared to that of the baseline case (FIG. 19B). Normal forces exerted on the contact surface by the three different robot segments are shown in FIG. 19B. These forces were identical to the baseline case (FIG. 4C).

The following describes some further embodiments. The general concepts of the current invention are not limited to these particular embodiments.

Functionality and Design-Related Embodiments

- Crawling gels with integrated electronics (such as those with sensors and cameras) for deployable exploration and sample collection in body cavities.
- Crawling gels with multiple segments that respond to different triggers to crawl forward and backward depending on how they are biased (FIGS. 21A-21D).
- Crawling gels with multiple segments that respond to different triggers to crawl sideways or forward depending on how they are biased (FIGS. 22A-22B).
- Crawling gels with multiple segments in different angles can be sequentially and locally actuated to bias the robot sideways and forward (FIGS. 23A-23B).
- Crawling gels with multiple segments, which can be biased towards a target with a gradient of stimuli (pH, temperature, optical or biomolecular). These robots would respond to pulsing signals within their sensitivity range and orient and deploy themselves to the target (FIG. 24).
- Gel crawlers in swarms that can communicate (send feedback) and achieve tasks by collective behavior. This can be done by introducing microelectronics in the robot (FIG. 25).
- Crawling gel robot loaded with drugs for localized delivery. One layer of the gel contains a drug-eluting patch or gel segment (FIG. 26).
- Crawling gel with dimensions ranging from sub-micron to centimeter scale for size-specific applications like biomedical application, payload delivery, leak repair, etc, in microfluidics, piping, and marine applications.
- Crawling gel with dimensions ranging from sub-micron to centimeter scale for size-specific applications like payload delivery, leak repair, etc, in microfluidics, piping, and marine applications.

Material Related Embodiments

- Crawling gel composed of pH, optical, and biomolecular responsive gels that crawl unidirectionally in response to disease makers, including small molecules, DNA, and proteins.
- Entirely biodegradable crawling gels composed of biodegradable materials such as
  - (a) Hydrolytically degraded hydrogels with PEG and polycaprolactone (PCL) functionalized with anhydrides, esters, and thioesters.
  - (b) Gelatin-based hydrogels that can undergo a phase transition in response to heat or bond cleaving.
  - (c) Glucose-based hydrogels that can be enzymatically degraded by amylose in the small intestine.
  - (d) Crawling gels with cell/organoid patterning built out of PEG-based hydrogels with incorporated peptide sequences that are specifically susceptible to cleavage by collagenase, matrix metalloproteinase (MMP), and plasmin proteases. The crawler can be first used as a scaffold but eventually would be remodeled by the cells and degrade as they proliferate in a biomimetic environment where the crawling gel exercises the cells to make functional sensing and actuating tissue.

Designing Control and Morphology to Optimize Behavioral Goals

Given a hydrogel crawler, we can use system id techniques to model the crawler locomotion. Then use the model to guide designs in control signal (i.e., how to provide stimuli signals), crawler morphology, and geometry parameters for achieving certain behavioral goals (as simple as making the crawler move forward fast). Specifically, in control signal designs, we can intelligently interpolate different control signals that do different things so that the robot can smoothly transition from one to another or do both things simultaneously. We can utilize simulation models such as FEA-based simulations to accelerate the optimization process. For example, we can create 100 robots with slightly different geometry and do system identification on them to see which one performs better.

Inducing Lateral Bias in the Robot Along with Forward Locomotion to Allow Steering A linked robot with two bilayers where the linker is also a lateral bilayer having swelling times $T_1$, $T_2$, $T_3$ such that $T_1 \neq T_2$. The lateral bilayer has a faster swelling time than the other two bilayers, which allows the robot to bend sideways and steer as it moves forward because of contact force asymmetry in the other two bilayers (FIG. 27).

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

REFERENCES AND NOTES

1. L. Ricotti, B. Trimmer, A. W. Feinberg, R. Raman, K. K. Parker, R. Bashir, M. Sitti, S. Martel, P. Dario, A. Menciassi, Biohybrid actuators for robotics: A review of devices actuated by living cells, *Sci Robot.* 2, (2017).
2. M Cianchetti, C. Laschi, A. Menciassi, P. Dario, Biomedical applications of soft robotics, *Nat. Rev. Mater.* 3, 143-153 (2018).
3. O. Erol, A. Pantula, W. Liu, D. H. Gracias, Transformer hydrogels: A review, *Adv. Mater. Technol.* 4, 1900043 (2019).
4. L. Hines, K. Petersen, G. Z. Lum, M. Sitti, Soft actuators for small-scale robotics, *Adv. Mater.* 29, (2017).
5. M. A. C. Stuart, W. T. S. Huck, J. Genzer, M. Müller, C. Ober, M. Stamm, G. B. Sukhorukov, I. Szleifer, V. V. Tsukruk, M. Urban, F. Winnik, S. Zauscher, I. Luzinov, S. Minko, Emerging applications of stimuli-responsive polymer materials, *Nat. Mater.* 9, 101-113 (2010).
6. X. Liu, J. Liu, S. Lin, X. Zhao, Hydrogel machines, *Mater. Today.* 36, 102-124 (2020).
7. L. Tan, A. C. Davis, D. J. Cappelleri, Smart polymers for microscale machines, *Adv. Funct. Mater.* 31, 2007125 (2021).
8. T.-Y. Huang, H. Gu, B. J. Nelson, Increasingly intelligent micromachines, *Annu. Rev. Control Robot. Auton. Syst.* 5, 279-310 (2022).
9. H. Yuk, S. Lin, C. Ma, M. Takaffoli, N. X. Fang, X. Zhao, Hydraulic hydrogel actuators and robots optically and sonically camouflaged in water, *Nat. Commun.* 8, 14230 (2017).
10. J. Liu, O. Erol, A. Pantula, W. Liu, Z. Jiang, K. Kobayashi, D. Chatterjee, N. Hibino, L. H. Romer, S. H. Kang, T. D. Nguyen, D. H. Gracias, Dual-gel 4D printing of bioinspired tubes, *ACS Appl. Mater. Interfaces.* 11, 8492-8498 (2019).
11. M. Li, A. Pal, A. Aghakhani, A. Pena-Francesch, M. Sitti, Soft actuators for real-world applications, *Nat. Rev. Mate.* 7, 1-15 (2021).
12. K. Jain, R. Vedarajan, M. Watanabe, M. Ishikiriyama, N. Matsumi, Tunable LCST behavior of poly(N-isopropylacrylamide/ionic liquid) copolymers, *Polym. Chem.* 6, 6819-6825 (2015).
13. K. Kobayashi, S. H. Oh, C. Yoon, D. H. Gracias, Multitemperature responsive self-folding soft biomimetic structures, *Macromol. Rapid Commun.* 39, (2018).
14. S. Maeda, Y. Hara, T. Sakai, R. Yoshida, S. Hashimoto, Self-walking gel, *Advanced Materials.* 19, 3480-3484 (2007).
15. H. Arora, R. Malik, L. Yeghiazarian, C. Cohen, U. Wiesner, Earthworm inspired locomotive motion from fast swelling hybrid hydrogel, *J. Polym. Sci., Part A: Polym. Chem.* 47, 5027-5033 (2009).
16. J. Kim, S. E. Chung, S.-E. Choi, H. Lee, J. Kim, S. Kwon, Programming magnetic anisotropy in polymeric microactuators, *Nat. Mater.* 10, 747-752 (2011).
17. F. Vernerey, T. Shen, The mechanics of hydrogel crawlers in confined environment, *J. R. Soc. Interface.* 14, (2017).
18. T. Shen, M. G. Font, S. Jung, M. L. Gabriel, M. P. Stoykovich, F. J. Vernerey, Remotely triggered locomotion of hydrogel mag-bots in confined spaces, *Sci. Rep.* 7, 16178 (2017).
19. G. Gao, Z. Wang, D. Xu, L. Wang, T. Xu, H. Zhang, J. Chen, J. Fu, Snap-buckling motivated controllable jumping of thermo-responsive hydrogel bilayers, *ACS Appl. Mater. Interfaces.* 10, 41724-41731 (2018).
20. A. W. Feinberg, A. Feigel, S. S. Shevkoplyas, S. Sheehy, G. M. Whitesides, K. K. Parker, Muscular thin films for building actuators and powering devices, *Science.* 317, 1366-1370 (2007).
21. V. Chan, K. Park, M. B. Collens, H. Kong, T. A. Saif, R. Bashir, Development of miniaturized walking biological machines, *Sci. Rep.* 2, 857 (2012).
22. A. S. Gladman, E. A. Matsumoto, R. G. Nuzzo, L. Mahadevan, J. A. Lewis, Biomimetic 4D printing, *Nat. Mater.* 15, 413-418 (2016).
23. Y. Mao, Z. Ding, C. Yuan, S. Ai, M. Isakov, J. Wu, T. Wang, M. L. Dunn, H. J. Qi, 3D printed reversible shape changing components with stimuli responsive materials, *Sci. Rep.* 6, 24761 (2016).
24. Q. Ge, A. H. Sakhaei, H. Lee, C. K. Dunn, N. X. Fang, M. L. Dunn, Multimaterial 4D printing with tailorable shape memory polymers, *Sci. Rep.* 6, 31110 (2016).
25. S. E. Bakarich, R. Gorkin, S. Naficy, R. Gately, M. in H. Panhuis, G. M. Spinks, 3D/4D printing hydrogel composites: A pathway to functional devices, *MRS Advances.* 1, 521-526 (2016).
26. J. Guo, R. Zhang, L. Zhang, X. Cao, 4D printing of robust hydrogels consisted of agarose nanofibers and polyacrylamide, *ACS Macro Lett.* 7, 442-446 (2018).
27. Y. Jin, Y. Shen, J. Yin, J. Qian, Y. Huang, Nanoclay-based self-supporting responsive nanocomposite hydrogels for printing applications, *ACS Appl. Mater. Interfaces.* 10, 10461-10470 (2018).
28. M. Schaffner, J. A. Faber, L. Pianegonda, P. A. Ruhs, F. Coulter, A. R. Studart, 3D printing of robotic soft actuators with programmable bioinspired architectures, *Nat. Commun.* 9, 878 (2018).

29. J. Liu, W. Liu, A. Pantula, Z. Wang, D. H. Gracias, T. D. Nguyen, Periodic buckling of soft 3D printed bioinspired tubes, *Extreme Mech. Lett.* 30, 100514 (2019).

30. E. R. Trueman, The Locomotion of Soft-bodied Animals (Edward Arnold, 1975).

31. S. Hirose, H. Yamada, Snake-like robots [Tutorial]. IEEE Robot. Autom. Mag. 16, 88-98 (2009).

32. R. D. Maladen, Y. Ding, C. Li, D. I. Goldman, Undulatory swimming in sand: Subsurface locomotion of the sandfish lizard, *Science* 325, 314-318 (2009).

33. Y. Tanaka, K. Ito, T. Nakagaki, R. Kobayashi, Mechanics of peristaltic locomotion and role of anchoring, *J. R. Soc. Interface.* 9, 222-233 (2012).

34. S. Kuroda, I. Kunita, Y. Tanaka, A. Ishiguro, R. Kobayashi, T. Nakagaki, Common mechanics of mode switching in locomotion of limbless and legged animals, *J. R. Soc. Interface.* 11, 20140205 (2014).

35. J. Aguilar, T. Zhang, F. Qian, M. Kingsbury, B. McInroe, N. Mazouchova, C. Li, R. Maladen, C. Gong, M. Travers, R. L. Hatton, H. Choset, P. B. Umbanhowar, D. I. Goldman, A review on locomotion robophysics: the study of movement at the intersection of robotics, soft matter and dynamical systems, *Rep. Prog. Phys.* 79, 110001 (2016).

36. A. J. Ijspeert, A. Crespi, D. Ryczko, J.-M. Cabelguen, From swimming to walking with a salamander robot driven by a spinal cord model, *Science* 315, 1416-1420 (2007).

37. A. J. Easteal, W. E. Price, L. A. Woolf, Diaphragm cell for high-temperature diffusion measurements. tracer diffusion coefficients for water to 363 K, *J. Chem. Soc., Faraday Trans.* 1 85, 1091-1097 (1989).

38. T. Tanaka, E. Sato, Y. Hirokawa, S. Hirotsu, J. Peetermans, Critical kinetics of volume phase transition of gels, *Phys. Rev. Lett.* 55, 2455-2458 (1985).

39. Y. Lu, K. Zhou, Y. Ding, G. Zhang, C. Wu, Origin of hysteresis observed in association and dissociation of polymer chains in water, *Phys. Chem. Chem. Phys.* 12, 3188-3194 (2010).

40. S. A. Chester, L. Anand, A thermo-mechanically coupled theory for fluid permeation in elastomeric materials: Application to thermally responsive gels, *J. Mech. Phys. Solids.* 59, 1978-2006 (2011).

41. R. Simič, M. Yetkin, K. Zhang, N. D. Spencer, Importance of Hydration and Surface Structure for Friction of Acrylamide Hydrogels. *Tribol. Lett.* 68, 64 (2020).

42. A. P. Liu, E. A. Appel, P. D. Ashby, B. M. Baker, E. Franco, L. Gu, K. Haynes, N. S. Joshi, A. M. Kloxin, P. H. J. Kouwer, J. Mittal, L. Morsut, V. Noireaux, S. Parekh, R. Schulman, S. K. Y. Tang, M. T. Valentine, S. L. Vega, W. Weber, N. Stephanopoulos, O. Chaudhuri, The living interface between synthetic biology and biomaterial design. *Nat. Mater.* 21, 390-397 (2022).

43. S. A. Chester, C. V. Di Leo, L. Anand, A finite element implementation of a coupled diffusion-deformation theory for elastomeric gels, *Int. J. Solids Struct.* 52, 1-18 (2015).

44. P. J. Flory, Thermodynamics of high polymer solutions, *J. Chem. Phys.* 10, 51-61 (1942).

45. D. Bonn, S. Tanase, B. Abou, H. Tanaka, J. Meunier, Laponite: Aging and shear rejuvenation of a colloidal glass, *Phys. Rev. Lett.* 89, 015701 (2002).

46. Q. Wang, Y. Zhao, Y. Yang, H. Xu, X. Yang, Thermosensitive phase behavior and drug release of in situ gelable poly(N-isopropylacrylamide-co-acrylamide) microgels. *Colloid and Polymer Science.* 285 (2007), pp. 515-521.

47. C. Love, E. D. Rainville, *Differential and Integral Calculus.* (Macmillan Company, 1962). [sixth edition]

48. W. Hong, X. Zhao, J. Zhou, Z. Suo, A theory of coupled diffusion and large deformation in polymeric gels, *J. Mech. Phys. Solids.* 56, 1779-1793 (2008).

49. S. A. Chester, L. Anand, A coupled theory of fluid permeation and large deformations for elastomeric materials, *J. Mech. Phys. Solids.* 58, 1879-1906 (2010).

50. C. Yoon, R. Xiao, J. Park, J. Cha, T. D. Nguyen, D. H. Gracias, Functional stimuli responsive hydrogel devices by self-folding, *Smart Mater. Struct.* 23, 094008 (2014).

51. J. G. Choi, H. Gwac, Y. Jang, C. Richards, H. Warren, G. Spinks, S. J. Kim, Poly (N-isopropylacrylamide) Hydrogel for Diving/Surfacing Device. *Micromachines,* 12, 210 (2021)

We claim:

1. A multisegmented robot, comprising:

a first robot segment comprising a first layer of active material at least one of integral with, attached to or formed on a first layer of passive material;

a second robot segment spaced apart from the first robot segment, the second robot segment comprising a second layer of the active material at least one of integral with, attached to, or formed on a second layer of the passive material; and a tether connecting the first and second robot segments, wherein the first layer of the active material and the second layer of the active material are each cyclically swellable and deswellable in response to a cyclically changing local environmental stimulus thereby causing each of the first robot segment and the second robot segment to cyclically change shape, wherein the first layer of the passive material has a surface arranged such that at least a portion thereof contacts a surface over which the multisegmented robot may crawl during the cyclically changing local environmental stimulus, wherein the second layer of the passive material has a surface arranged such that at least a portion thereof contacts the surface over which the multisegmented robot may crawl during the cyclically changing local environmental stimulus, and wherein the second robot segment has a greater frictional resistance to movement over a period of the cyclically changing local environmental stimulus than a frictional resistance to movement of the first robot segment over the period of the cyclically changing local environmental stimulus resulting in translational motion of the multisegmented robot along a direction from the first robot segment to the second robot segment.

2. The multisegmented robot according to claim 1, wherein the cyclically changing local environmental stimulus is at least one of a local temperature, a local pH, a local electromagnetic field intensity, a local chemical composition, disease marker or a local biomolecular concentration.

3. The multisegmented robot according to claim 1, wherein said first and second layers of active materials the first layer of the active material and the second layer of the active material each comprise a gel.

4. The multisegmented robot according to claim 3, wherein the gel is selected from the group consisting of thermoresponsive poly N-isopropylacrylamide, polyacrylic acid, poly (imidazoled glycidyl methacrylate- co-diethyleneglycol methyl ether methacrylate), a lower critical solution temperature and/or upper critical solution temperature responsive acrylate, a magnetic field responsive ferrogel, a gel having crosslinked magnetic particles, a light responsive spirobenzopyran, cyclodextrin, cinnamic acid, coumarin, an azobenzene derivative gel, a gel seeded with gold nanorods, carbon nanotubes, copper chlorophyllin that undergo a photothermal effect, an electric field responsive polyelectrolyte gel, a chemically and/or biochemically responsive deoxyribonucleic acid (DNA) polymerization gel, an oscilatory gel functionalized by tris bipyridine ruthenium (II) undergoing a Belousov-Zhabotinsky reaction, a glucose sensitive gel, an enzyme sensitive gel, a gel reacting to alkaline phosphatase.

5. The multisegmented robot according to claim 1, wherein said first and second layers of passive materials the first layer of the passive material and the second layer of the passive material each comprise a polymer comprising an acrylamide, a polysaccharide, a polyethylene glycol-based gel or material, or a hydrogel.

6. The multisegmented robot according to claim 5, wherein said first and second layers of passive materials the first layer of the passive material and the second layer of the passive material each comprise polyacrylamide.

7. The multisegmented robot according to claim 1, wherein at least one of the first robot segment and the second robot segment comprises a material additive that alters a response of at least one of said first and second layers of active material at least one of the first layer of the active material and the second layer of the active material to the cyclically changing local environmental stimulus.

8. The multisegmented robot according to claim 1, wherein at least one of the first robot segment and the second robot segment comprises a material additive that alters the cyclically changing local environmental stimulus.

9. The multisegmented robot according to claim 1, wherein the tether consists essentially of a passive material.

10. The multisegmented robot according to claim 1, wherein the tether comprises a patterned structure of the passive material and the active material.

11. The multisegmented robot according to claim 1, wherein dimensions of the first layer of the active material and the second layer of the active material and the first layer of the passive material and the second layer of the passive material layers are selected to result in the greater frictional resistance to movement of the second robot segment compared to the frictional resistance to movement of the first robot segment.

12. The multisegmented robot according to claim 1, wherein a first material of the first layer of passive material layer and a second material of the second layer of the passive material layer are selected to result in the greater frictional resistance to movement of the second robot segment compared to the frictional resistance to movement of the first robot segment.

13. The multisegmented robot according to claim 1, further comprising:

a third robot segment disposed proximate and displaced from the second robot segment on a side of the second robot segment opposite the first robot segment so as to form a linear arrangement of the first robot segment, the second robot segment, and the third robot segment, the third robot segment comprising a third layer of the active material at least one of integral with, attached to or formed on a third layer of the passive material;

a second tether connecting the second robot segment and the third robot segment;

a fourth robot segment displaced from the third robot segment on a side of the third robot segment opposite the second robot segment so as to form a linear arrangement of the first robot segment, the second robot segment, the third robot segment, and the fourth robot segment, the fourth robot segment comprising a fourth layer of the active material at least one of integral with, attached to, or formed on a fourth layer of the passive material; and a third tether connecting the third robot segment and the fourth robot segment, wherein the third layer of active material and the fourth layer of active material are each cyclically swellable and deswellable in response to a corresponding cyclically changing local environmental stimulus thereby causing each of the third robot segment and the fourth robot segment to cyclically change shape, wherein the third layer of the passive material has a surface arranged such that at least a portion thereof contacts the surface over which the multisegmented robot may crawl during the cyclically changing local environmental stimulus, wherein the fourth layer of the passive material has a surface arranged such that at least a portion thereof contacts the surface over which the multisegmented robot may crawl during the cyclically changing local environmental stimulus, and wherein the fourth robot segment has a greater frictional resistance to movement over a period of the cyclically changing local environmental stimulus than a frictional resistance to movement of the third robot segment over the period of the cyclically changing local environmental stimulus resulting in translational motion of the multisegmented robot along a direction from the first robot segment to the fourth robot segment.

14. The multisegmented robot according to claim 1, further comprising:

a third robot segment disposed proximate and displaced from the first robot segment and the second robot segment, the third robot segment comprising a third layer of the active material at least one of integral with, attached to or formed on a third layer of the passive material;

a fourth robot segment disposed proximate and displaced from the first robot segment, the second robot segment, and the third robot segment, the fourth robot segment comprising a fourth layer of the active material at least one of integral with, attached to, or formed on a fourth layer of the passive material;

a second tether connecting the third robot segment and the fourth robot segments segment; and a third tether one of integral with or attached to the tether and the second tether, wherein the third layer of the active material and the fourth layer of the active material are each cyclically swellable and deswellable in response to a corresponding cyclically changing a second local environmental stimulus thereby causing each of the third robot segment and the fourth robot segment to cyclically change shape, wherein the third layer of the passive material has a surface arranged such that at least a portion thereof contacts the surface over which the multisegmented robot may crawl during the cyclically changing the second local environmental stimulus, wherein the fourth layer of the passive material has a surface arranged such that at least a portion thereof contacts the surface over which the multisegmented robot may crawl during the cyclically changing the second local environmental stimulus, wherein the fourth robot segment has a greater frictional resistance to movement over a period of the cyclically changing second local environmental stimulus than a frictional resistance to movement of the third robot segment over the period of the cyclically changing second local environmental stimulus resulting in translational motion of the multisegmented robot along a direction from the third robot segment to the fourth robot segment, and wherein the third robot segment and the fourth robot segment form a line substantially parallel to the first robot segment and the second robot segment with a direction of motion opposite thereof.

15. The multisegmented robot according to claim 14, wherein the second local environmental stimulus is different in at least one of type or magnitude from the local environmental stimulus.

16. The multisegmented robot according to claim 1, further comprising:

a third robot segment disposed proximate and displaced from the first robot segment and second robot segment segments, the third robot segment comprising a third layer of the active material at least one of integral with, attached to, or formed on a third layer of passive material;

a fourth robot segment disposed proximate and displaced from the first robot segment, the second robot segment, and the third robot segment, the fourth robot segment comprising a fourth layer of the active material at least one of integral with, attached to, or formed on a fourth layer of the passive material;

a second tether connecting the third robot segment and the fourth robot segment; and a third tether one of integral with or attached to the tether and the second tether, wherein the third layer of the active material and the fourth layer of the active material are each cyclically swellable and deswellable in response to a corresponding cyclically changing a second local environmental stimulus thereby causing each of the third robot segment and the fourth robot segment to cyclically change shape, wherein the third layer of the passive material has a surface arranged such that at least a portion thereof contacts the surface over which the multisegmented robot may crawl during the cyclically changing the second local environmental stimulus, wherein the fourth layer of the passive material has a surface arranged such that at least a portion thereof contacts the surface over which the multisegmented robot may crawl during the cyclically changing the second local environmental stimulus, wherein the fourth robot segment has a greater frictional resistance to movement over a period of the cyclically changing second local environmental stimulus than a frictional resistance to movement of the third robot segment over the period of the cyclically changing second local environmental stimulus resulting in translational motion of the multisegmented robot along a direction from the third robot segment to the fourth robot segment, and wherein the third robot segment and the fourth robot segment form a line at an angel greater than zero degrees and less than 180 degrees to the first robot segment and the second robot segment segments with a direction of motion along the line from the third robot segment to the fourth robot segment.

17. The multisegmented robot according to claim 16, wherein the third robot segment and the fourth robot segment form the line substantially perpendicular to the first robot segment and the second robot segment segments.

18. The multisegmented robot according to claim 16, wherein the second local environmental stimulus is different in at least one of type or magnitude from the local environmental stimulus.

19. The multisegmented robot according to claim 1, further comprising a cargo carried by the robot.

20. The multisegmented robot according to claim 19, wherein the cargo comprises at least one of an electronic device, an opto-electronic device, an optical device, a medical imaging contrast agent, a diagnostic agent, an imaging sensor, an analyte measurement sensor, a drug delivery agent or a therapeutic agent.

* * * * *